(12) United States Patent
Evans

(10) Patent No.: US 6,181,381 B1
(45) Date of Patent: Jan. 30, 2001

(54) CAMERA LENS WITHIN PIVOTING HINGE IN PORTABLE ELECTRONIC DEVICE

(75) Inventor: D. Scott Evans, Cockeysville, MD (US)

(73) Assignee: NCR Corporation, Dayton, OH (US)

( * ) Notice: Under 35 U.S.C. 154(b), the term of this patent shall be extended for 0 days.

(21) Appl. No.: 08/766,701

(22) Filed: Dec. 13, 1996

(51) Int. Cl.⁷ .......................... H04N 5/222; H04N 5/225
(52) U.S. Cl. ................ 348/373.01; 348/376; 348/333.06
(58) Field of Search ..................... 348/373, 375, 348/376, 333, 334, 214, 347; 345/126; 396/448

(56) References Cited

U.S. PATENT DOCUMENTS

| | | | |
|---|---|---|---|
| 4,283,132 | * 8/1981 | Engelsmann et al. | 354/202 |
| 4,681,418 | * 7/1987 | Kodaira | 354/288 |
| 4,887,161 | * 12/1989 | Watanabe et al. | 358/224 |
| 5,014,267 | * 5/1991 | Tompkins et al. | 370/62 |
| 5,442,453 | * 8/1995 | Takagi et al. | 358/335 |
| 5,546,147 | * 8/1996 | Baxter et al. | 354/187 |
| 5,592,224 | * 1/1997 | Shim | 348/333 |
| 5,598,209 | * 1/1997 | Cortjens et al. | 348/211 |
| 5,659,361 | * 8/1997 | Jin | 348/75 |
| 5,664,243 | * 9/1997 | Okada et al. | 396/246 |
| 5,674,003 | * 10/1997 | Andersen et al. | 364/514 |
| 5,719,799 | * 2/1998 | Isashi | 348/552 |
| 5,738,321 | * 4/1998 | Moriyasu | 248/274.1 |
| 5,739,859 | * 4/1998 | Hattori et al. | 348/375 |
| 5,742,341 | * 4/1998 | Ohishi et al. | 348/373 |
| 5,973,915 | * 10/1999 | Evans | 361/681 |

* cited by examiner

Primary Examiner—Wendy Garber
Assistant Examiner—Jacqueline Wilson
(74) Attorney, Agent, or Firm—Gregory A. Welte

(57) ABSTRACT

A housing for a portable electronic device which produces output on a display. The display is rotatable with respect to the housing, about a pivot. A video camera is located at the pivot, and the display rotates about it.

3 Claims, 33 Drawing Sheets

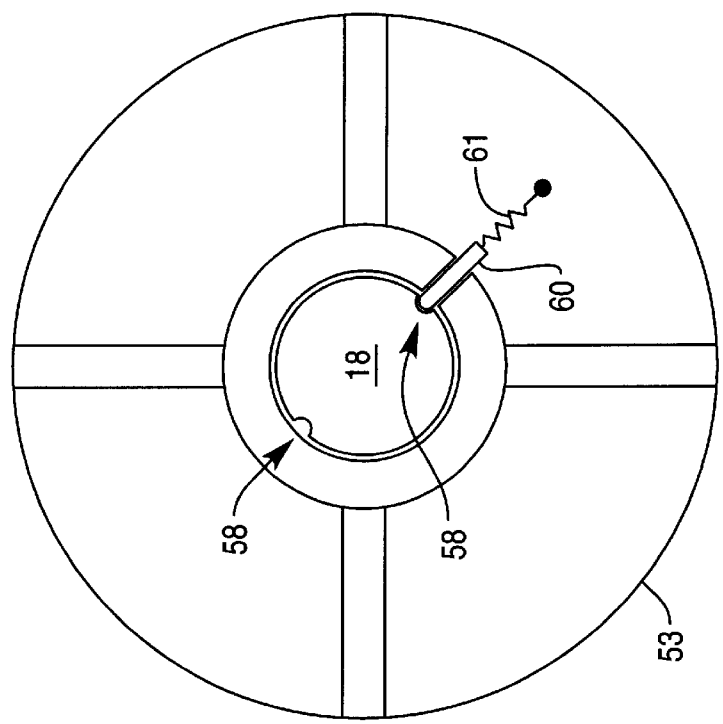
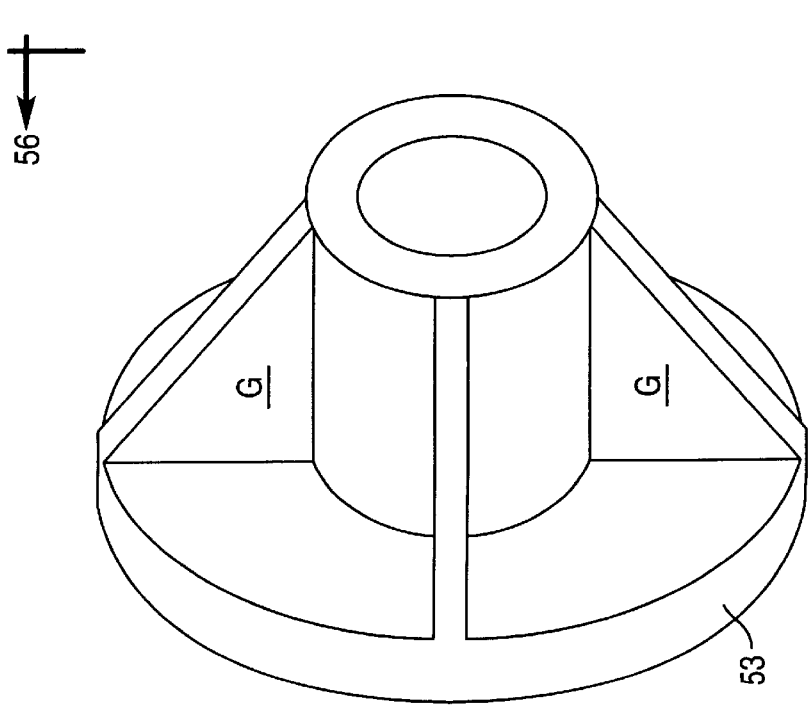

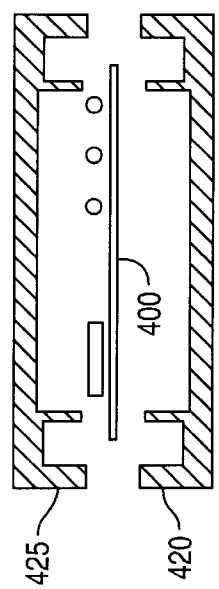
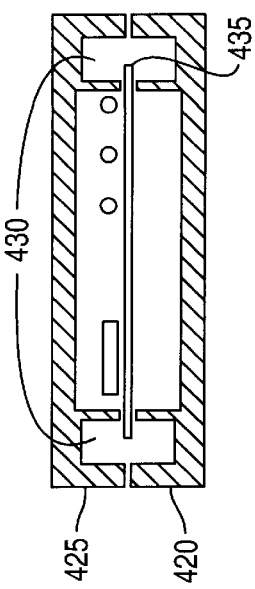
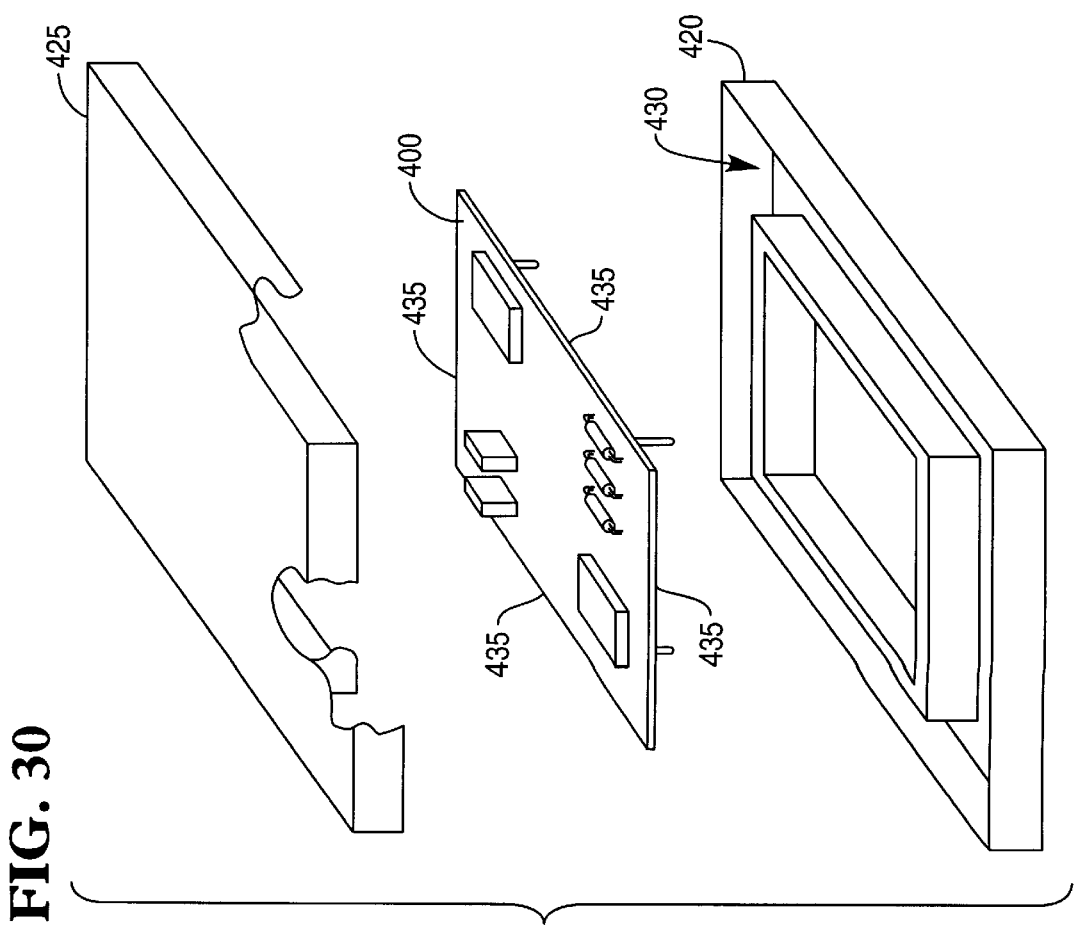

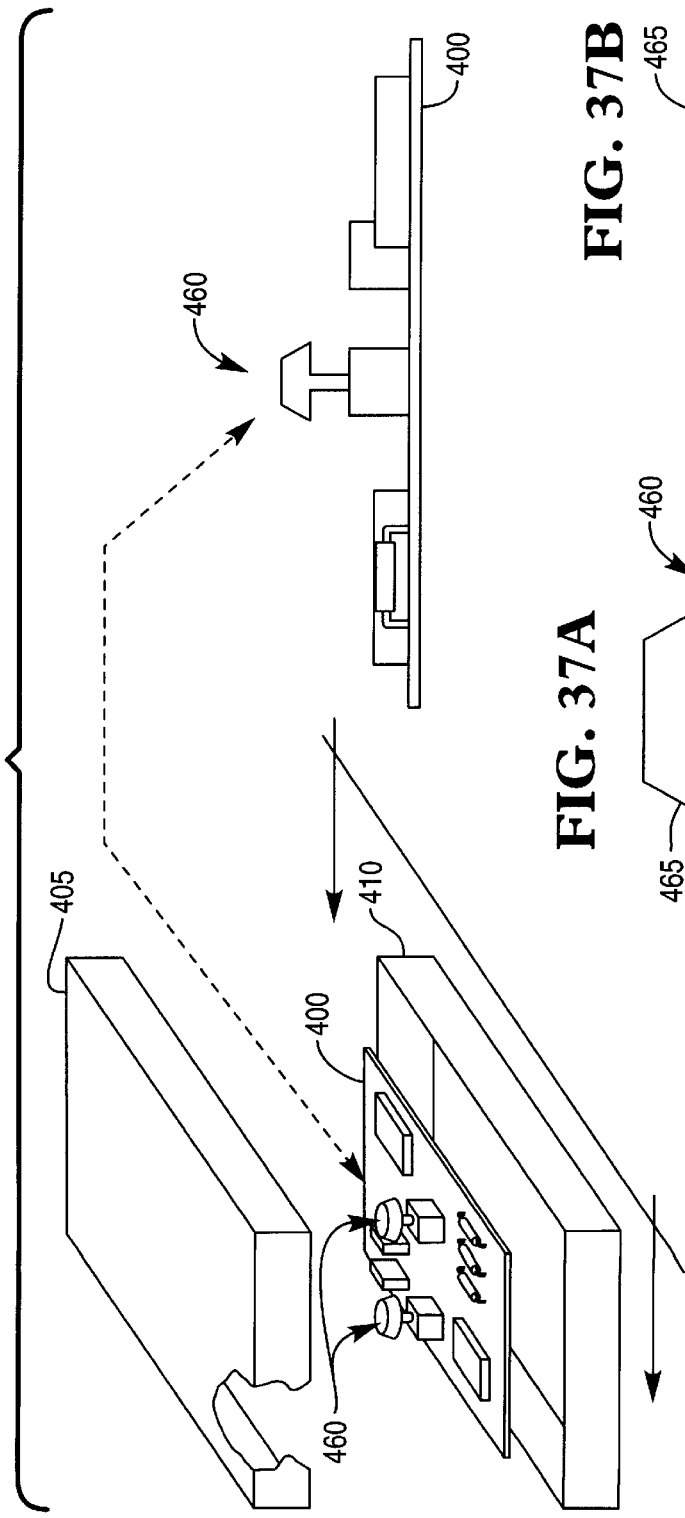
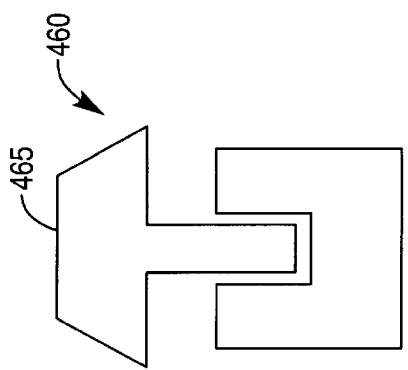
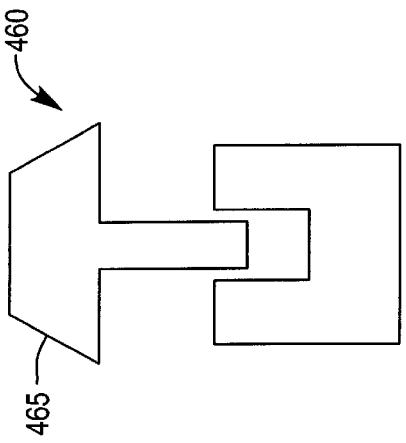

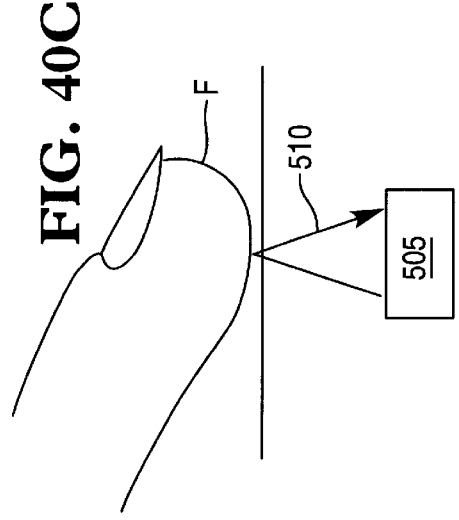
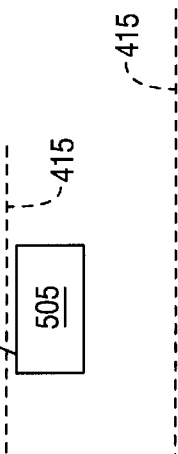
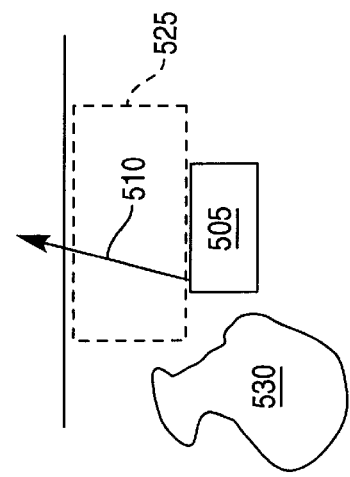
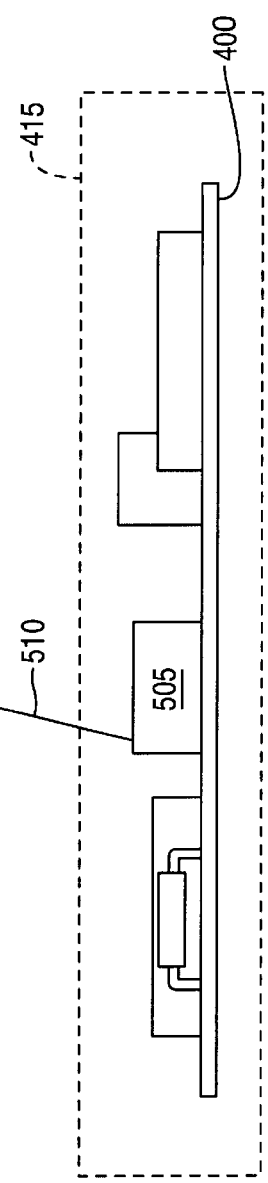
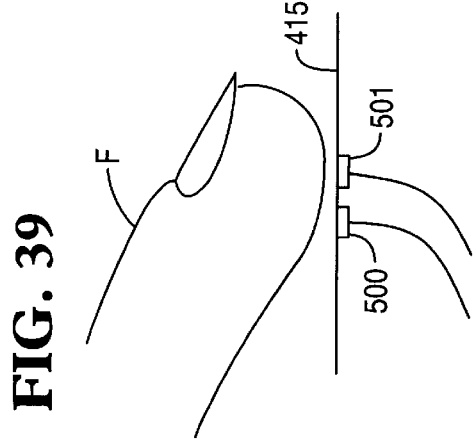

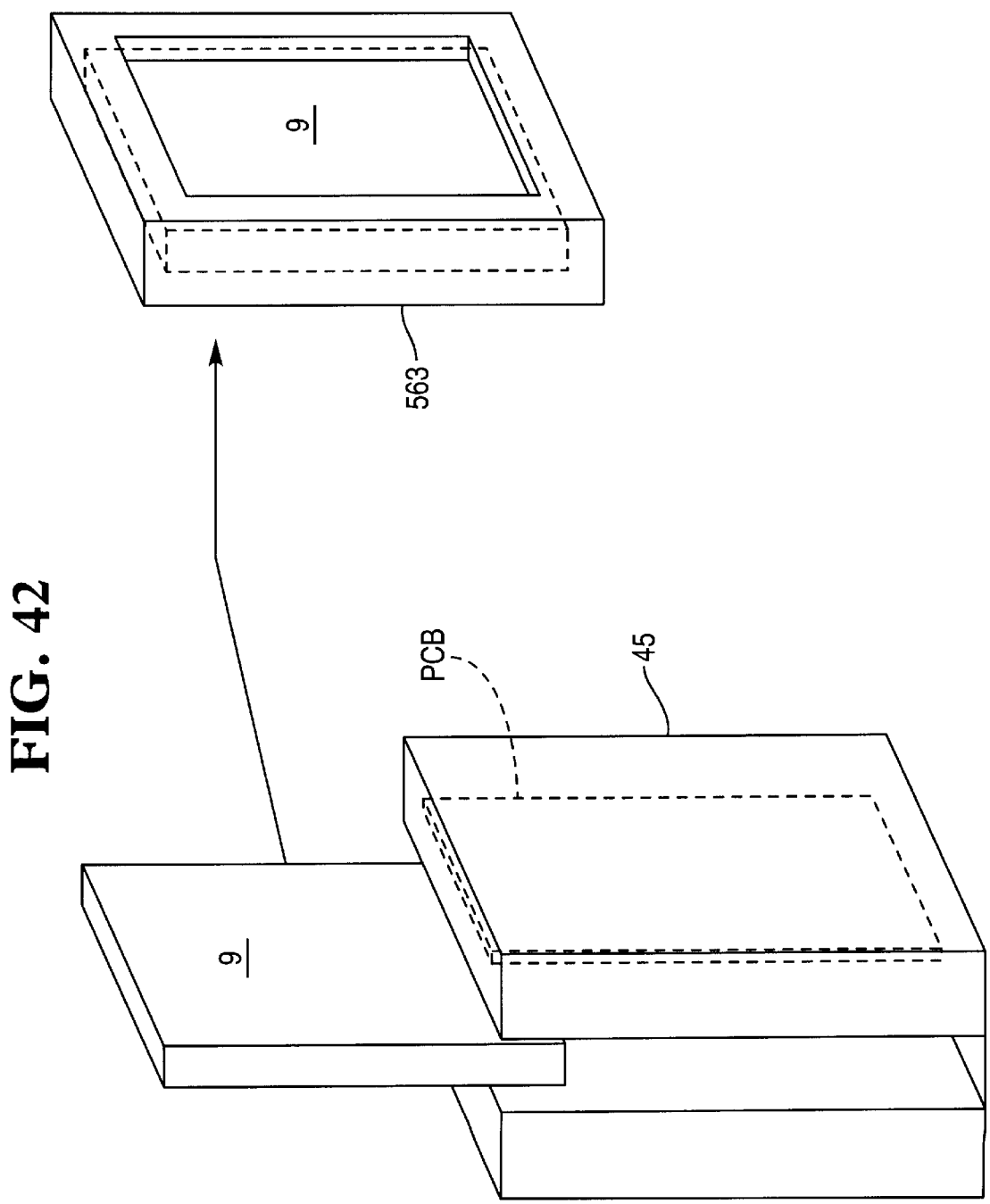

CAMERA LENS WITHIN PIVOTING HINGE IN PORTABLE ELECTRONIC DEVICE

BACKGROUND OF THE INVENTION

As electronic devices become more compact and powerful, it is expected that their use will become more widespread. With more widespread usage, ease-of-use, ease-of-storage, and other ergonomic considerations will assume greater importance.

Convenience of storage, and deployment, of visual displays in portable electronic devices represents one ergonomic factor which is believed to have received insufficient attention within the prior art.

OBJECTS OF THE INVENTION

An object of the invention is to provide an improved electronic device.

A further object of the invention is to provide an electronic device in which a display is rotatable, in a single plane, from a stored position to a deployed position.

A still further object of the invention is to provide an electronic device having a pivoting display in which a video camera is co-axial with the pivot axis.

SUMMARY OF THE INVENTION

In one form of the invention, a display in an electronic device rotates about a pivot. A video camera is coaxial with the pivot axis.

BRIEF DESCRIPTION OF THE DRAWINGS

FIG. 7B is an end-on view of the apparatus of FIG. 7A, taken along arrows 56. In FIG. 7B a detent system is shown, which biases pin 18 in a specified position, with respect to plate 53. FIG. 7A illustrates bushing 18A of FIG. 6.

FIG. 30 illustrates another type of mold, which can be used in place of that of FIG. 29A.

FIG. 31 is a cross-sectional view of the apparatus of FIG. 30, in exploded form.

FIG. 32 is a cross-sectional view of the apparatus of FIG. 30, in assembled form.

FIG. 36 illustrates switches 460, mounted to printed circuit board 400.

FIGS. 37A and 37B illustrate mechanical motion of switch button 465.

FIG. 39 illustrates contacts 500 and 501, whose electrical properties are changed by finger F.

FIG. 40A is a cross-sectional view of the apparatus of the type shown in FIG. 29B, with added proximity detector 505.

FIGS. 40B and 40C illustrate non-reflection, and reflection, respectively, of light ray 510.

FIG. 40D illustrates positioning of the proximity detector 505 at the surface of body 415.

FIGS. 41 and 42 illustrate other forms of the invention.

DETAILED DESCRIPTION OF THE INVENTION

Figure 1B:
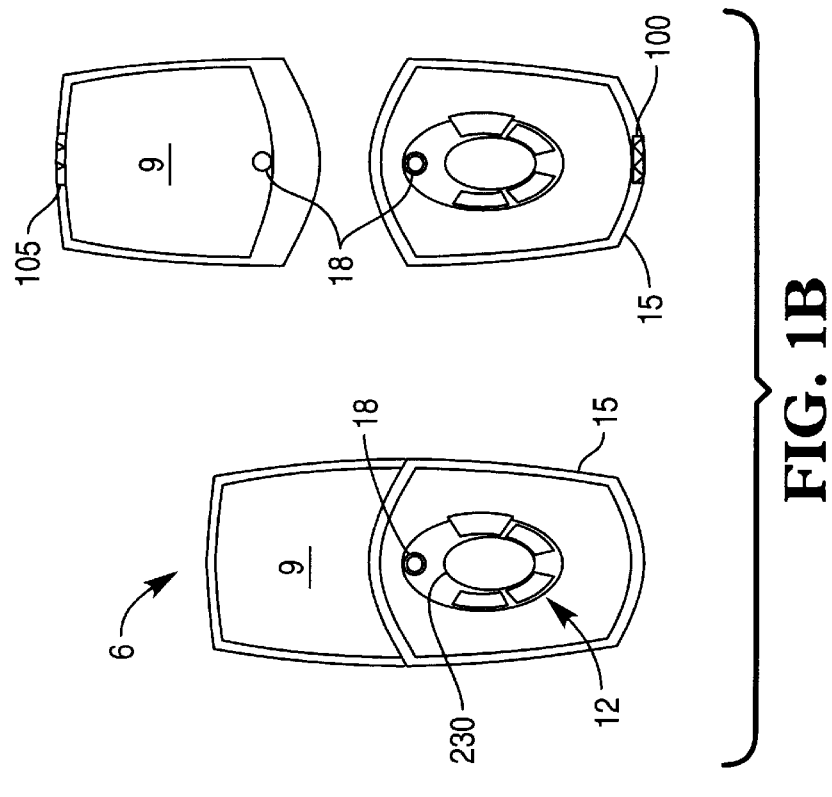
FIG. 1B illustrates one form of the invention, taking the form of a housing 15 and display 9, which can perform some of the functions of housing H and display LCD of FIG. 1A.
Figure 1A:
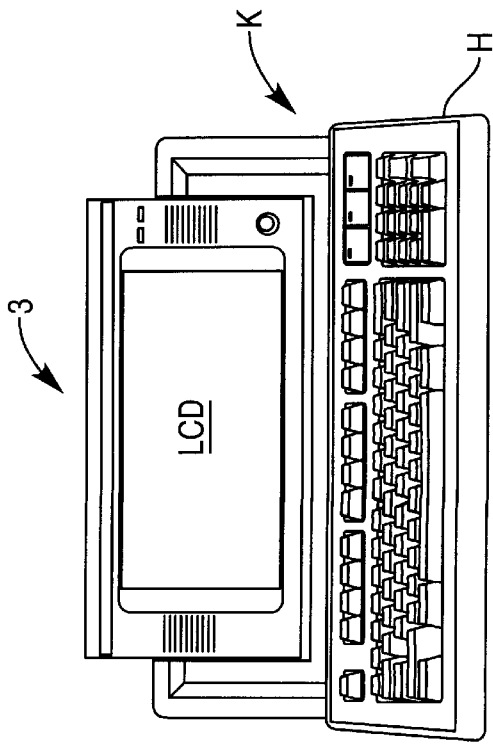
FIG. 1A illustrates a prior-art device 3, taking the form of a portable computer having a housing H and a display LCD.

FIG. 1A illustrates a portable computer 3, which contains (1) a Liquid Crystal Display LCD, or other type of display, (2) an input device in the form of a keyboard K, and (3) a housing H, which contains electronic components (not shown). FIG. 1B illustrates one form of the invention 6. It contains (1) a display 9, analogous to the LCD of the portable computer 3, (2) a keypad 12, analogous to the keyboard K of the portable computer 3, and (3) a housing 15, analogous to the housing H of the portable computer 3.

Figures 2A, 2B, 2C:
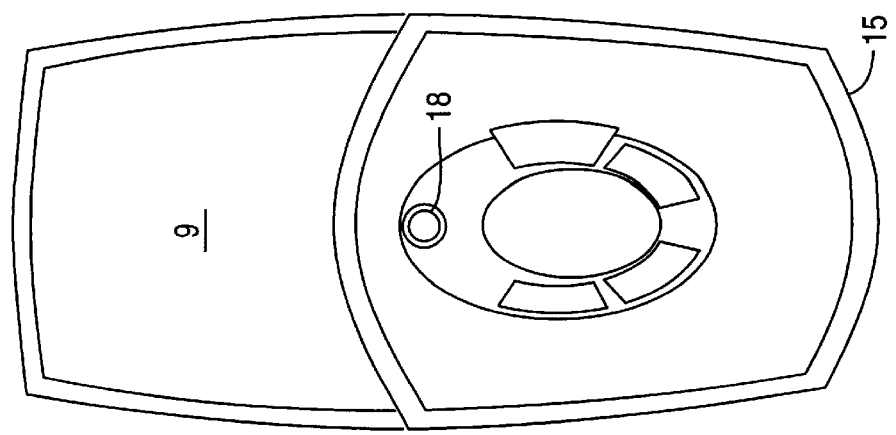
FIGS. 2A–2C illustrate rotation of display 9 about pivot 18.

From one perspective, the invention 6 can be broken into two parts: (1) the display 9 and (2) the housing 15, which carries the keypad 12, as indicated on the right side of FIG. 1B. The display 9 rotates about a pivot point, or pin, 18, as illustrated by the sequence shown in FIG. 2. In FIG. 2A, the display 9 is deployed in its operational position. In FIG. 2C, the display 9 is shown in its stowed position. In FIG. 2B, the display 9 is shown mid-way between the operational and stowed positions.

FIG. 3 illustrates one form of the invention in simplified schematic view. The housing 15 is U-shaped, with surfaces 21 and 24 in FIG. 3A representing the legs of the U and surface 27 representing the base of the U. The display 9 is free to rotate 360 degrees about pivot point 18, as indicated by the sequence of FIGS. 3A through 3D.

Figure 3D:
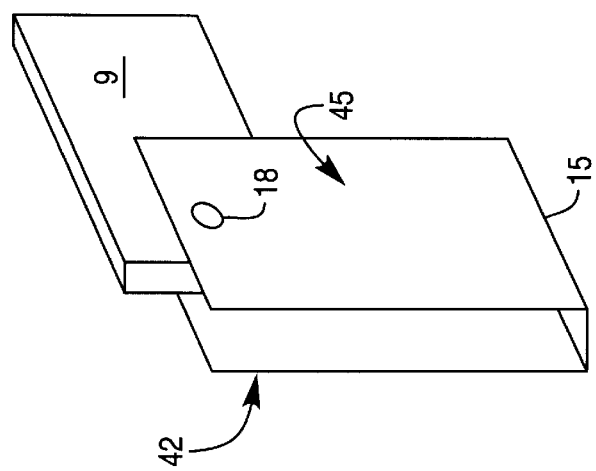
FIGS. 3A–3D illustrate a sequence of positions of display 9, showing 360-degree rotation.
Figure 3C:
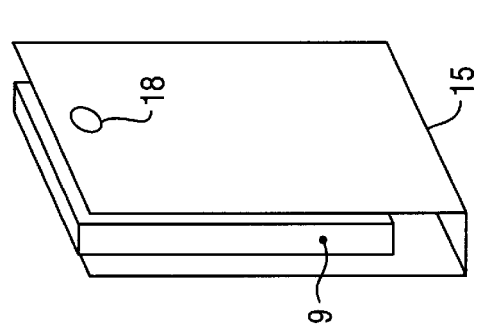
Figure 3B:
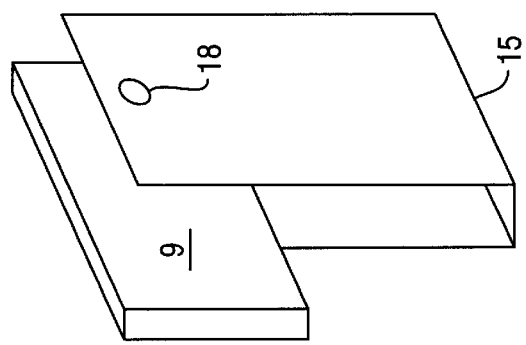
Figure 3A:
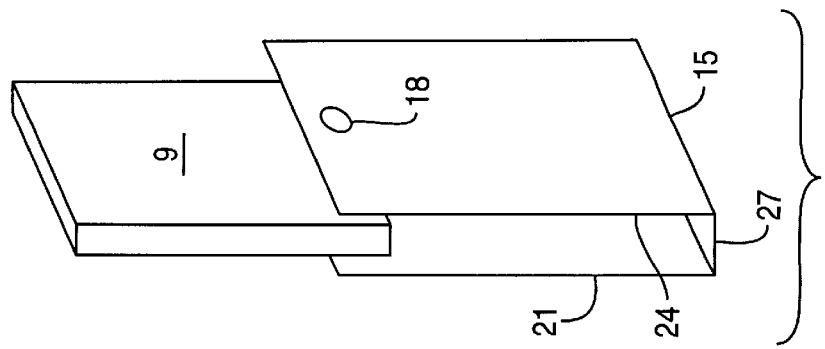
Figure 4A:
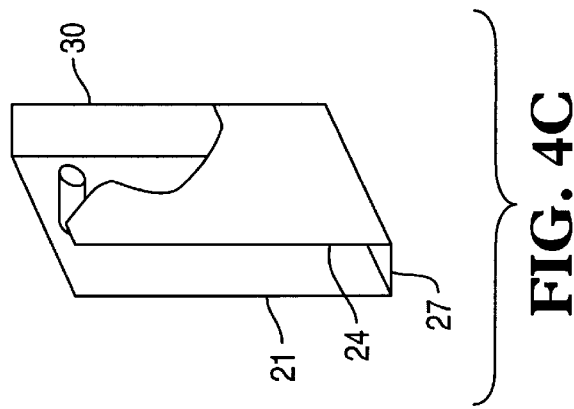
FIG. 4A illustrates an imaginary plane 29 bisecting a schematic form of the invention.

FIG. 4A illustrates an imaginary plane 29 bisecting the invention of FIG. 3. If the housing 15 is cut along this plane, and opened, clamshell style, as in FIG. 4B, as indicated by arrows 31, then interior surfaces 33, 36, 39A, and 39B become visible. These surfaces are exposed, both during use and storage of the invention, to the external environment in much the same way as surfaces 42 and 45 in FIG. 3D. That is, these surfaces face inward in the embodiment of FIG. 4A, and can be viewed as the inner surfaces of a pocket. However, despite the inner-facing disposition of these "pocket surfaces" dust and other debris are expected to collect on them.

In fact, debris-collection may be more severe on such surfaces, for at least two reasons. One is that the surfaces are hidden from view, so that debris-accumulation will not be readily noticed. A second reason is that, because debris-accumulation will not be noticed, a tendency by a user to wipe the surfaces clean will not arise.

Figure 5:
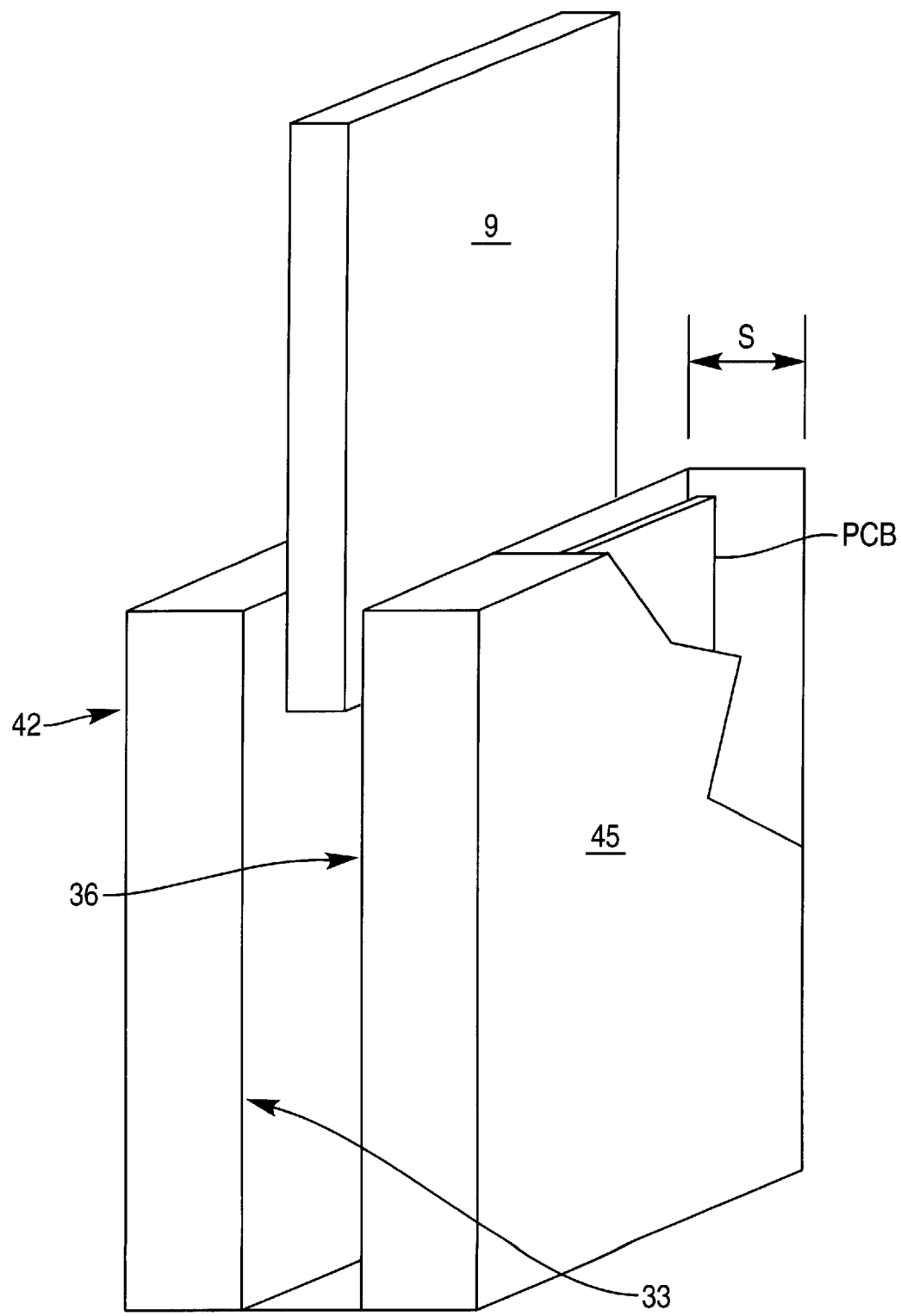
FIG. 5 illustrates a chamber contained between surfaces 36 and 45, and containing a printed circuit board PCB.

Therefore, it is preferred that the pocket surfaces 33, 36, 39A, and 39B, be designed as exterior surfaces, in a manner similar to surfaces 42 and 45 in FIG. 3D. One ramification of this design preference is that the pocket surfaces should carry no components which should not be exposed to the external environment, such as printed circuit boards. FIG. 5 illustrates how this preference can be accommodated.

Figure 4B:
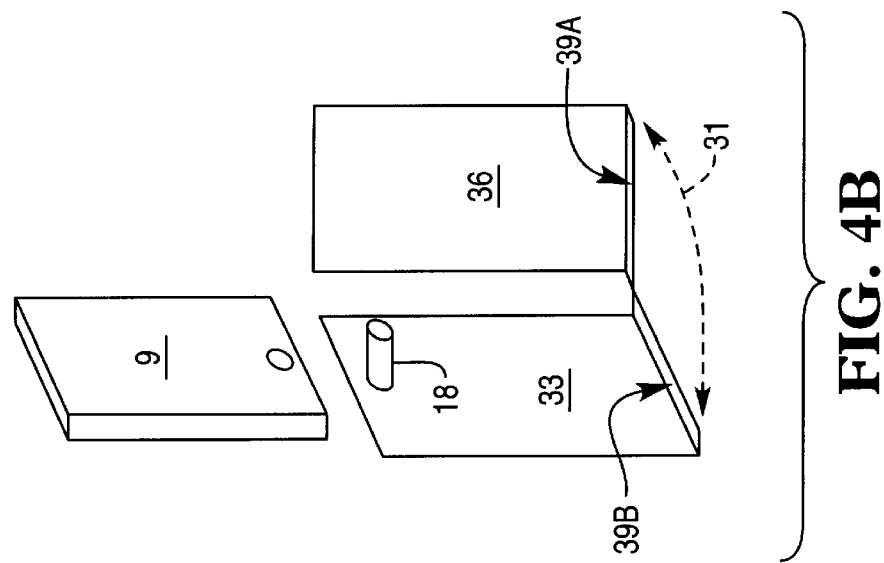
FIG. 4B illustrates opening of the housing 15, after being cut by the imaginary plane of FIG. 4A.
Figure 4C:
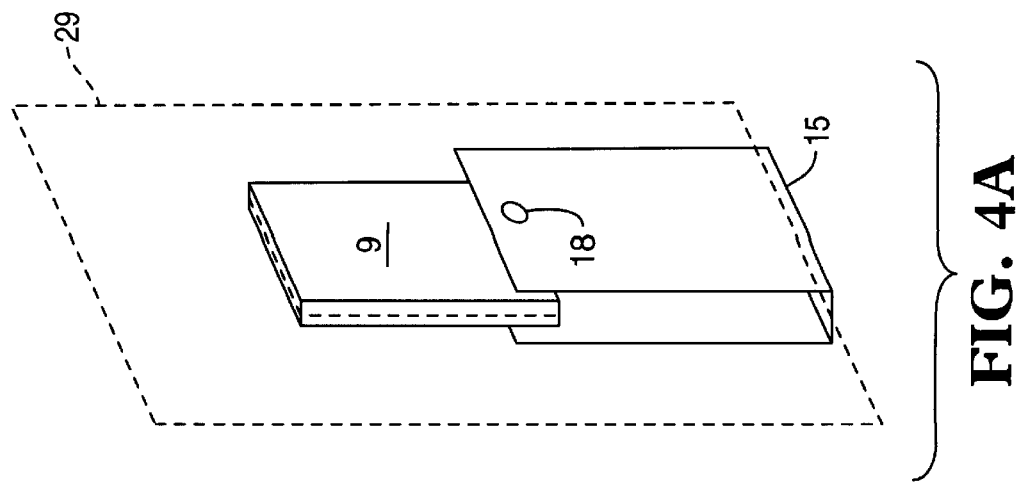
FIG. 4C illustrates a wall 30 added to the apparatus of FIG. 4A, which restricts 360-degree rotation.

FIG. 5 is a more detailed schematic than FIGS. 3 and 4, wherein walls of the housing were represented as idealized geometric planes. In FIG. 5, the space S within the housing is illustrated. That is, surfaces 36 and 45 (shown also in FIGS. 3D and 4B) define a space, or chamber, S. Preferably, chamber S is used to hold a printed circuit board PCB, rather than mounting the PCB on a pocket surface 33 or 36.

That is, any printed circuit boards should reside between surfaces 45 and 36, as indicated in FIG. 5. Printed circuit boards should not be exposed to the external environment, as they would be on the pocket surfaces, because dust and moisture can collect on them, and present a short-circuit hazard.

Figure 6A:
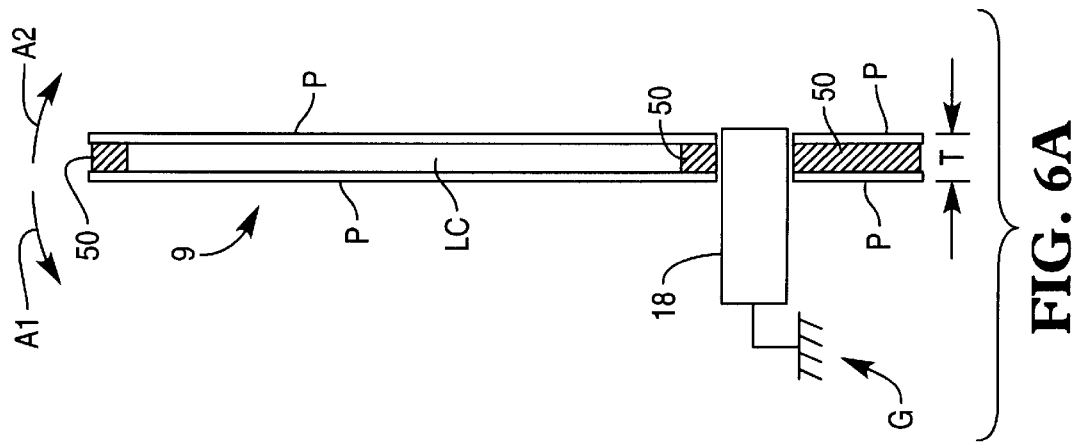
FIG. 6A is a simplified schematic of one type of display, namely, a liquid-crystal display.

FIG. 6A illustrates a simplified view of mounting the display 9 to the pivot 18. The display 9 can be viewed as comprising two plates P, which may be rigid, thin, transparent sheets, and constructed of polymerized plastic resin. Between the plates is held a layer, or film, of liquid crystal material LC. Seals 50 prevent escape of the liquid crystal material. Construction of liquid crystal displays is known in the art.

The display is supported by a pin 18, which is affixed to the housing 15 (not shown, but represented by ground symbol G). However, because the thickness T of the display 9 is rather small, in the range of roughly ⅛ inch, the display 9 will not be held perpendicular to the pin 18. Instead, the display 9 can rock, as indicated by arrows A1 and A2. Further, the rocking can be accentuated by the fact that pin 18 is supported at only one point, and is, in effect, cantilevered from the ground symbol G. That is, the pin 18 itself can rock.

Figure 6B:
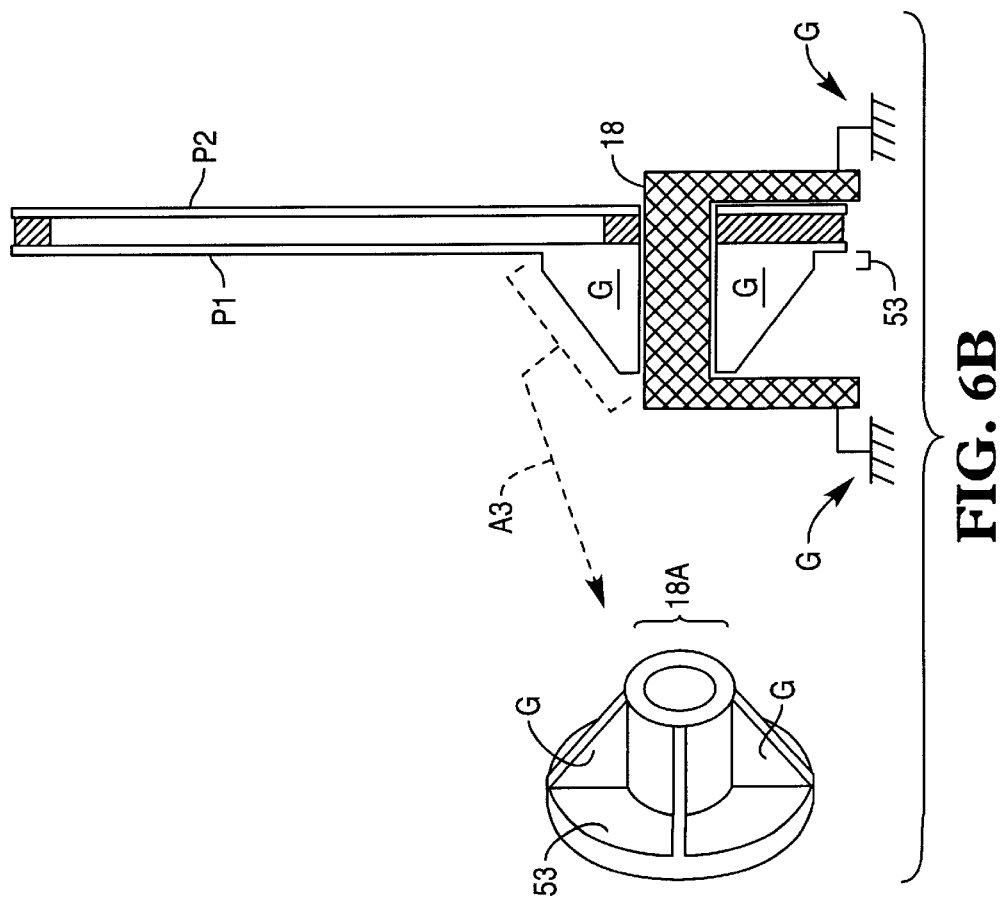
FIG. 6B is a more detailed schematic of a bushing 18A attached to plate P1 by gussets G.

To reduce the rocking, a bushing 18A, supported by gussets G, can be added, as indicated in FIG. 6B. The bushing 18A connects to a circular plate 53, and the gussets G extend between the plate 53 and the bushing 18A. Further, pin 18 can be supported at both ends, as indicated. Pin 18 is journaled into the bushing 18A.

FIG. 7 illustrates one approach to locking the display 9 in position about the pivot 18. FIG. 7A illustrates the gusset-structure of FIG. 6B. FIG. 7B is an end-view, taken in the direction of arrows 56 in FIG. 7A.

Pin 18 contains two recesses 58, located 180 degrees apart. A pin 60, biased by spring 61, engages one of the recesses, and restricts rotation of plate 53 with respect to pin 18. With this arrangement, the display 9 is biased either into the position shown in FIG. 2A or FIG. 2C.

Figure 8:
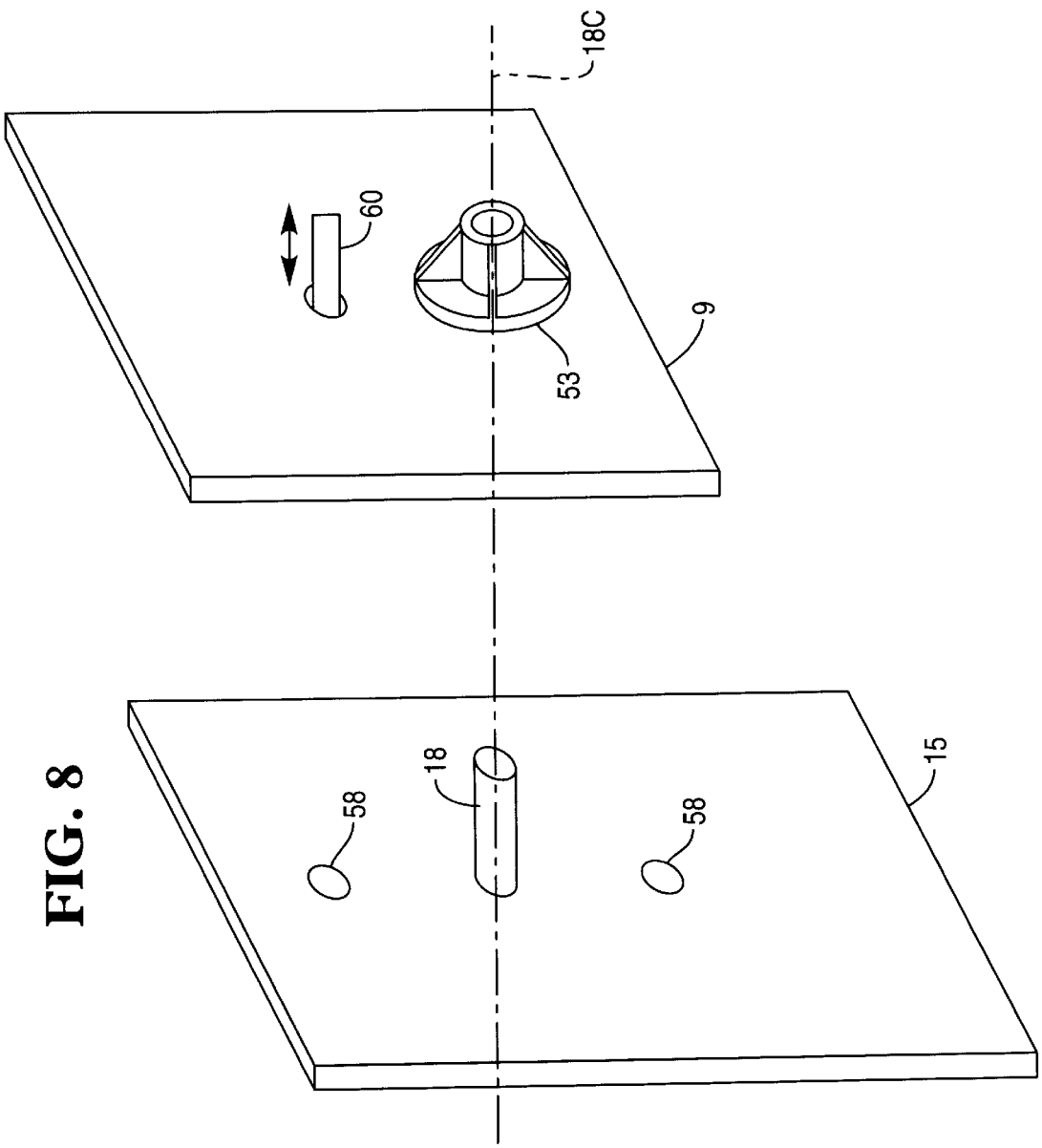
FIG. 8 illustrates a second type of detention system.

Pin 60 in FIG. 7 is shown as moving radially with respect to pivot pin 18. Radial movement is not essential. The biasing pin 60 can move parallel to the axis 18C of pivot pin 18, as indicated in FIG. 8. The biasing pin 60 engages one of two recesses 58 contained in the housing 15.

Figure 9C:
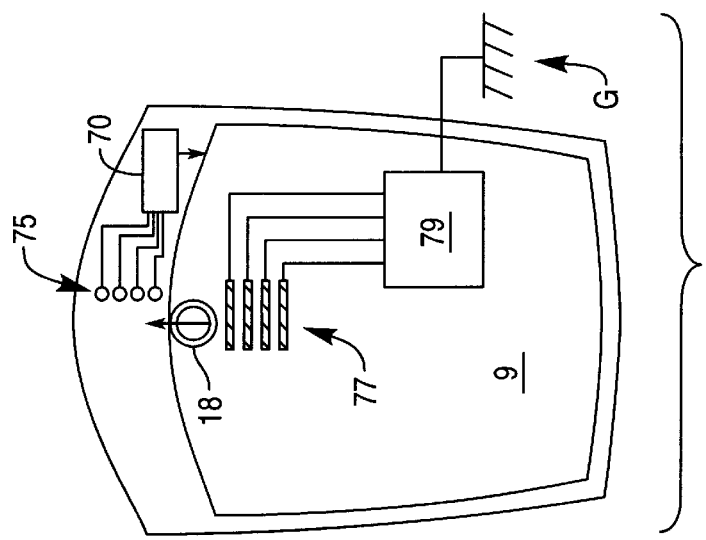
FIGS. 9A–9C illustrate apparatus for carrying signals from a signal source 79 (shown in FIG. 9B) to an LCD controller 70.
Figure 9B:
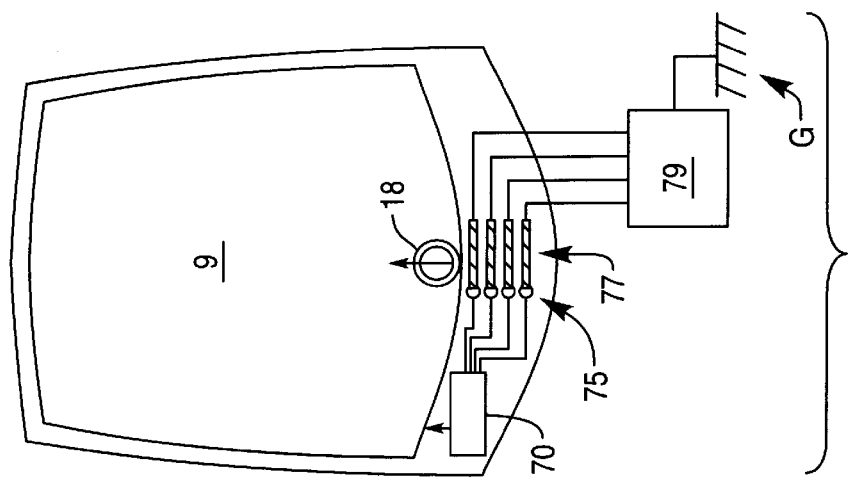
Figure 9A:
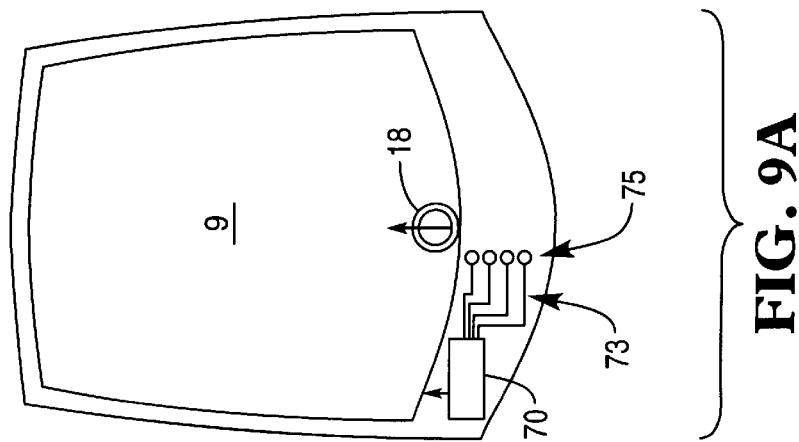

Electrical connection must be made with the display 9. In the case of a liquid crystal display, the display contains numerous pixels. A signal must be delivered to each pixel. FIG. 9 illustrates a controller 70 which controls the pixels. The controller 70 receives input signals on lines 73.

Each line 73 is connected to a contact 75. In FIG. 9B, each contact 75 connects to a flexible finger 77. Each finger 77 receives a signal from signal generator 79, which is fixed with respect to the housing 15 (not shown, but indicated by ground symbol G).

FIG. 9B illustrates the display 9 in its deployed position. When the display 9 is rotated into its stowed position, as in FIG. 9C, the contacts 75 rotate away from the fingers 77, as indicated. At this time, communication between apparatus 79 and the controller 70 is broken.

Figure 10:
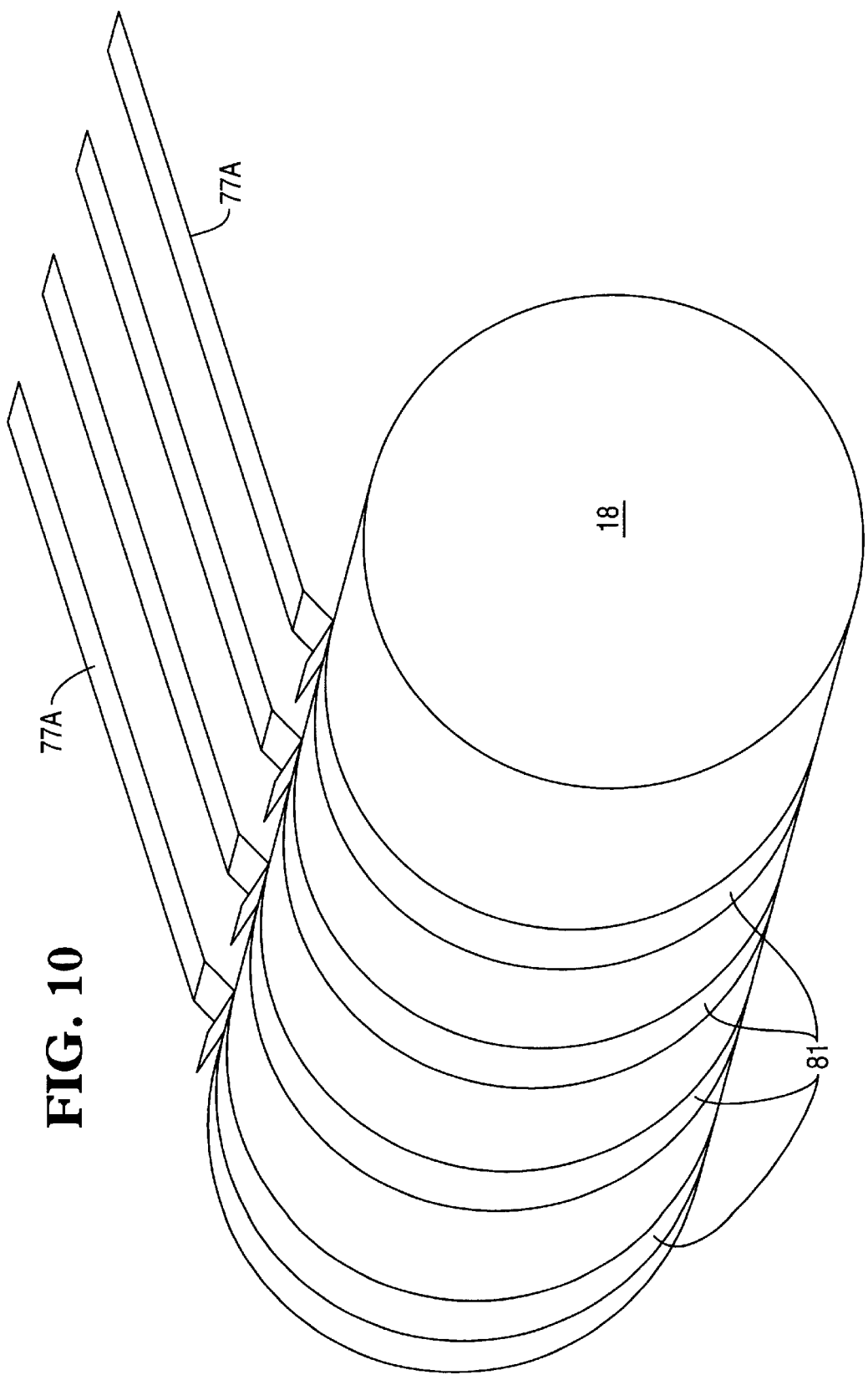
FIG. 10 illustrates an alternate approach to carrying signals from the source 79 of FIG. 9B to the LCD controller 70. Components 70 and 79 are not shown in FIG. 10.

Another approach to delivering signals to the controller is illustrated in FIG. 10. Fingers 77A mate with cylindrical contacts 81. Fingers 77A are affixed to the housing 15 (not shown) and are stationary with respect to the housing. Contacts 81 rotate about pivot 18, and are not stationary with respect to the housing.

Additional Considerations

1. The display 9 rotates about pivot 18, and in a single plane. Plane 29 in FIG. 4A represents one such plane. (Of course, the display 9 has finite thickness, and does not actually occupy a single geometric plane. Nevertheless, individual atoms can be identified in the display 9 which reside in a single plane. When the display 9 rotates about the pivot 18, these atoms remain in that plane.)

The phrase "rotate in a plane" refers to such rotation. In "rotating within a plane," the display 9 rotates about an axis which is perpendicular to the plane. This axis is the axis of the pin 18.

That is, as used herein, the term "rotation," refers to rotation about a single axis. Even though a generalized body can exhibit compound rotation, as by simultaneously exhibiting roll, pitch, and yaw, it must be remembered that the overall rotation is composed of the individual components of roll, pitch, and yaw, each of which rotates about its own axis.

In the invention, a single component of rotation of the display is present, with respect to the housing 15. That component is about the axis of the pin 18.

Figure 11:
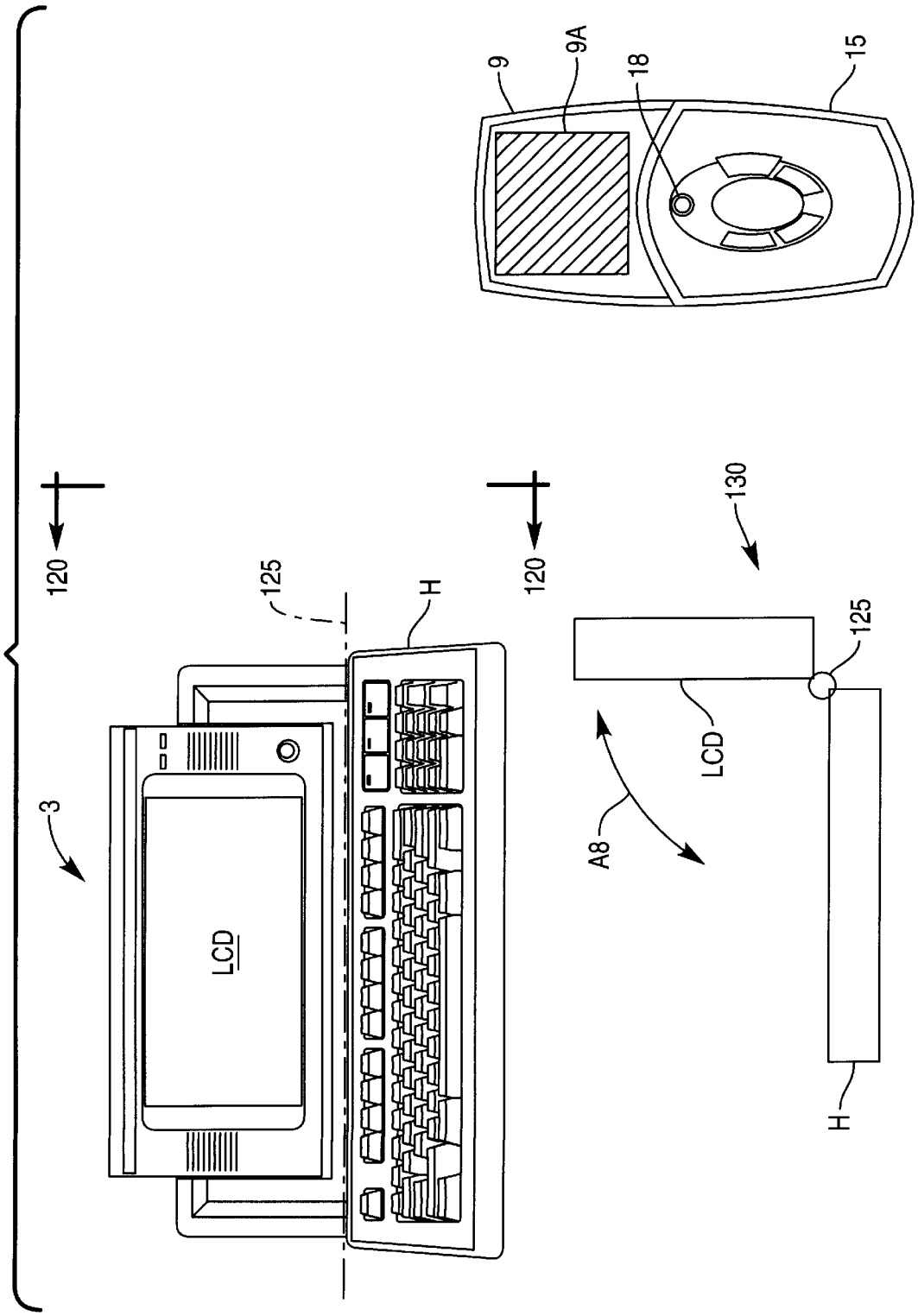
FIG. 11 illustrates some differences between the types of rotation undertaken by the apparatus of FIGS. 1A and 1B.

From another point of view, FIG. 11 illustrates a plane segment 9A, which is co-extensive with the viewing area of the display 9. For example, if the display 9 were of the liquid-crystal type, then plane 9A would be co-extensive with the viewing area of that liquid-crystal display.

A single plane (not shown) within housing 15 can be found which is parallel with plane 9A. These two planes remain parallel, both when the display 9 is deployed in a stationary position (as in FIG. 2A), and also while the display 9 is rotating about pivot 18.

In contrast, no such pair of planes can be found in the prior-art device 3. In that device, rotation occurs about axis 125. If that device is viewed in the direction of arrows 120, then the schematic 130 can be derived. The display LCD rotates about axis 125, as indicated by arrows A8. When rotation occurs, no plane which is co-extensive with the viewing area of the LCD remains parallel with a single plane located in the housing 15.

The surface of display 9 need not be flat, but can be curved, like a convex television picture tube.

The video driver circuitry can be located on the display 9, instead of on the system printed circuit board.

2. The housing 15 in FIG. 1B can contain a microphone 100, and the display section 9 can contain a small speaker 105. These transducers, of the type used in telephone handsets, allow the apparatus shown to operate as a telephone, provided, of course, that the necessary circuitry is supplied.

First Additional Embodiment

Figure 12:
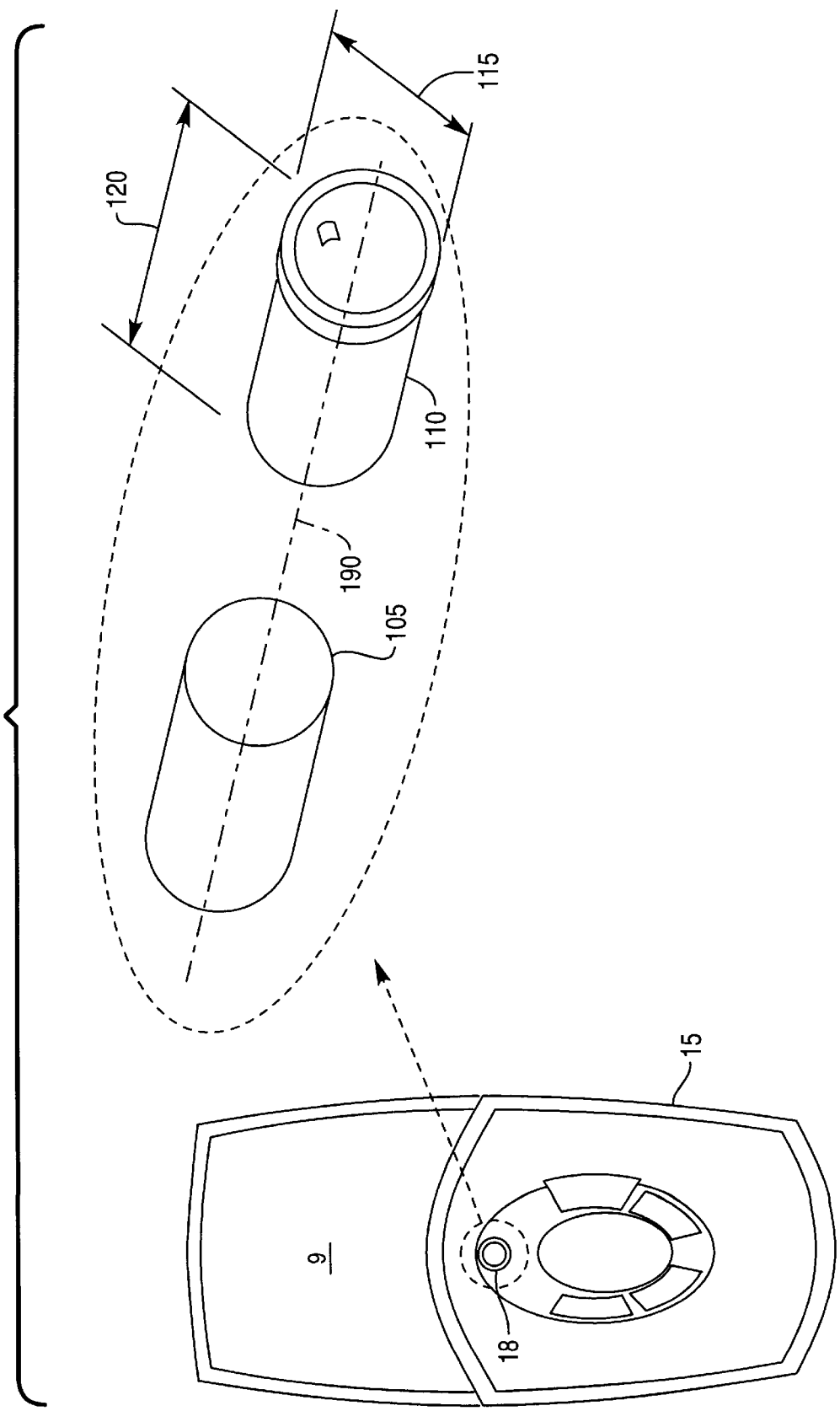
FIG. 12 illustrates one form of the invention.

1. FIG. 12 illustrates an embodiment wherein pivot 18 comprises a bushing 105, which contains a miniature video camera 110. Preferably, the camera is about ½ inch in diameter (dimension 115) and about ¾ inch long (dimension 120). Such cameras are commercially available.

Figure 13:
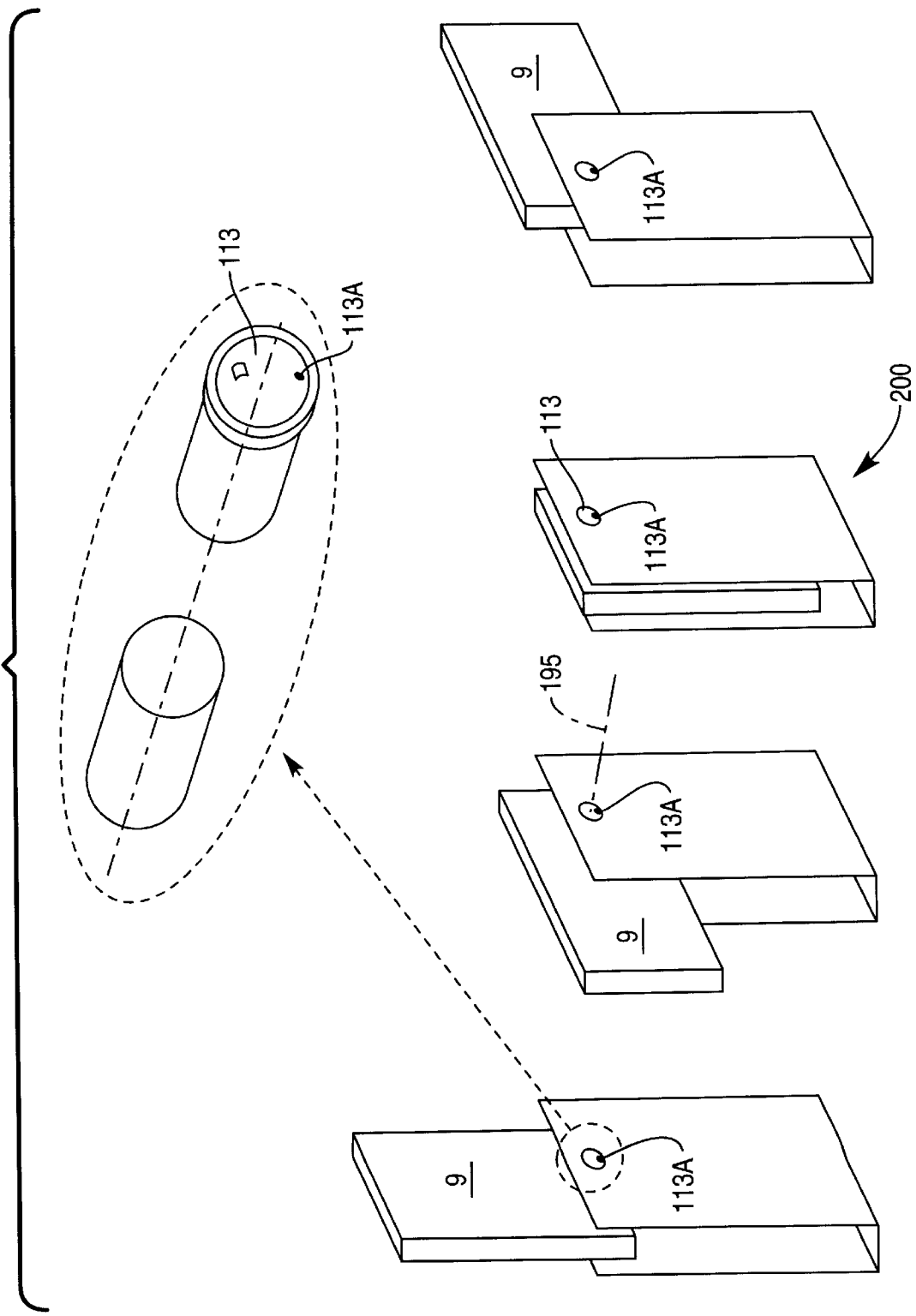
FIG. 13 illustrates how camera lens 113 remains stationary, during rotation of the display 9, as indicated by reference dot 113A.
Figure 14:
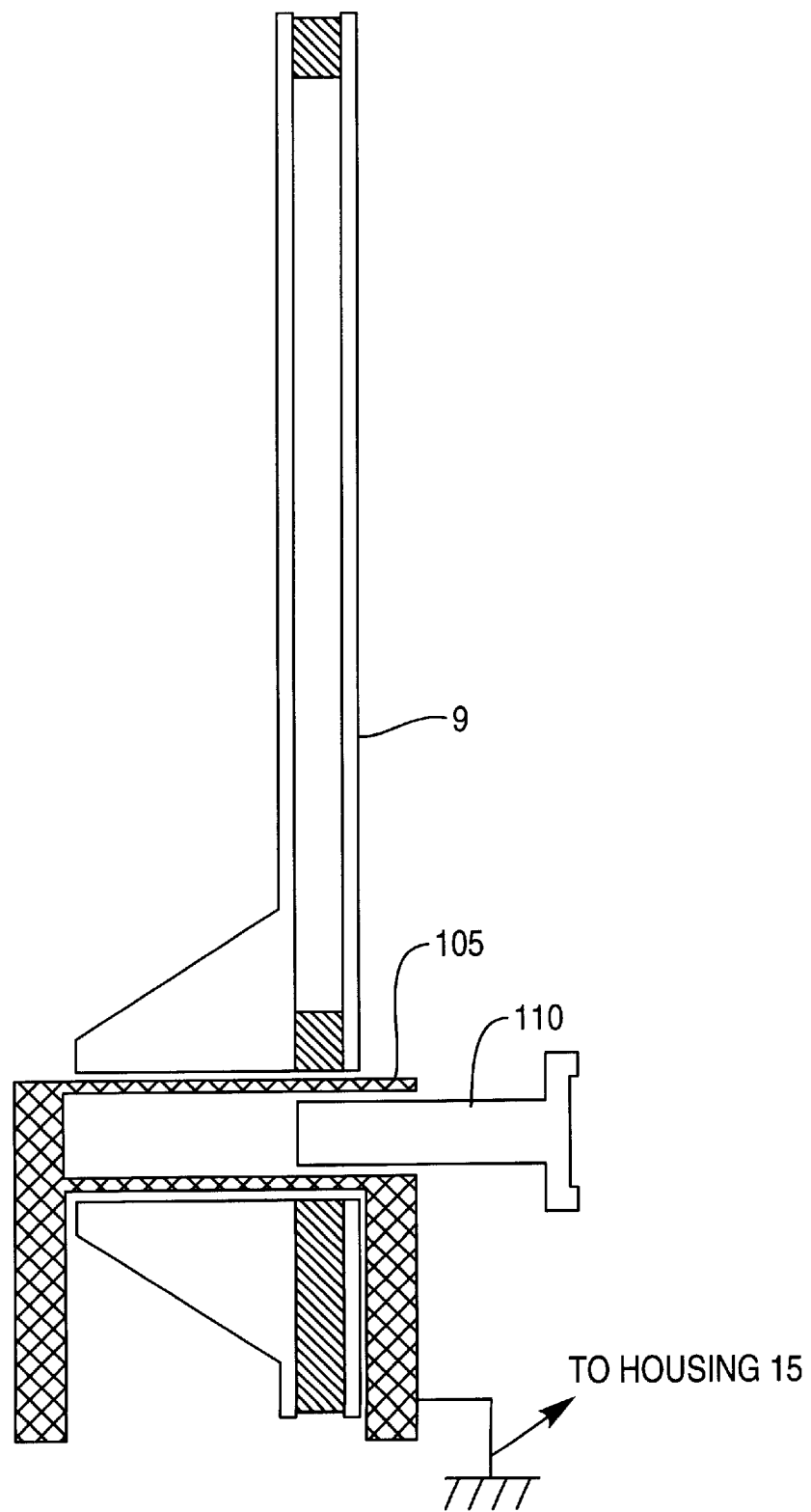
FIG. 14 is a cross-sectional view of bushing 105, illustrating its containment of camera 110.

The camera 110 is preferably fixed to the housing 15, so that reference dot 112 in FIG. 13, which is affixed to the camera lens 113, does not move as the display 9 rotates as shown. To accomplish this fixity of the reference dot, the camera 110 in FIG. 14 can be held within the bushing 105, with the latter anchored to the housing 15, as indicated by the ground symbol.

With this lack of camera rotation, if a user holds the invention in the hand, with the camera pointing at the user's face, the image produced by the camera will not rotate as the display is rotated as shown in FIG. 13.

This lack of rotation can be significant when the invention is used in video conferencing applications. Video conferencing systems are commercially available, which are implemented using the ordinary Personal Computer, or PC, one if which is indicated in FIG. 1, in the form of a laptop computer. If the invention implements the architecture of the PC, then the invention, if equipped with a cellular modem, becomes capable of holding video conferences.

One such video conferencing system is sold under the trade name VISTIUM, and is available from Lucent Technologies, Naperville, Ill. (formerly AT & T Global Information Solutions Company). A video conference, allows two users, remote from each other, to speak with, and see, each other. Such conferencing systems require a video camera, such as that indicated in FIG. 12.

Features of Additional Embodiment

Figure 15A:
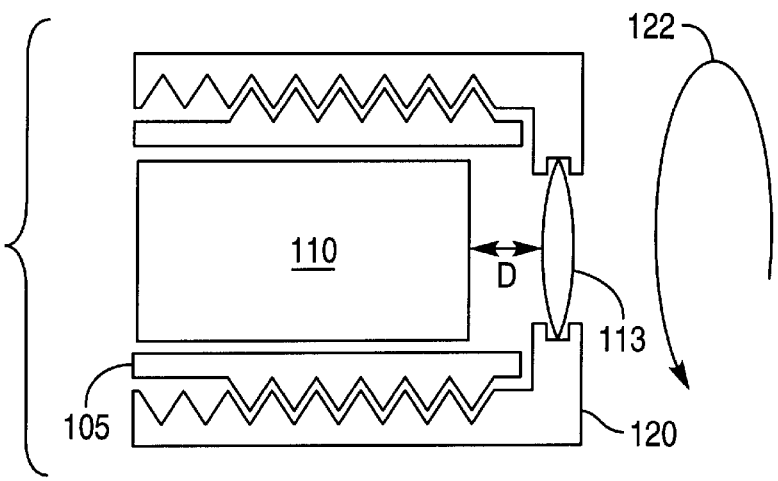
FIGS. 15A–15C illustrate a focusing mechanism of camera 110.
Figure 15B:
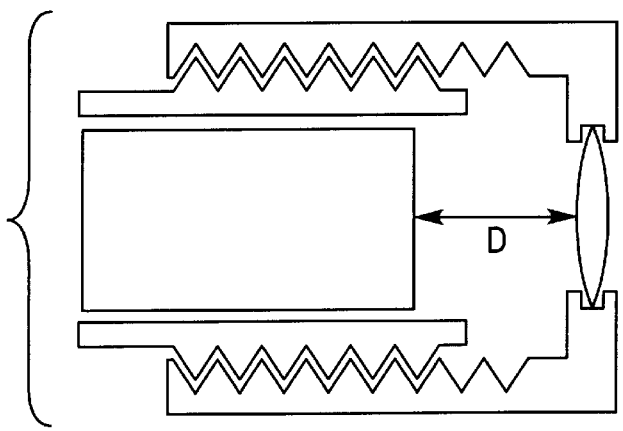

1. FOCUSING ASPECTS. In one embodiment, the lens 113 in FIG. 13 is of the fixed-focus type, and resembles the lens used in simple cameras. In another embodiment, the focal plane of the lens can change. As shown in FIGS. 15A and 15B, a support 120 for lens 113 is threaded to the bushing 105. When the support 120 is rotated, as indicated by arrow 122, the distance D, between the lens 113 and the camera 110, changes. This change in distance changes the focus of the image which is produced on the imaging element (not shown) of the camera, which can take the form of a CCD (Charge-Coupled Device) array.

Figure 15C:
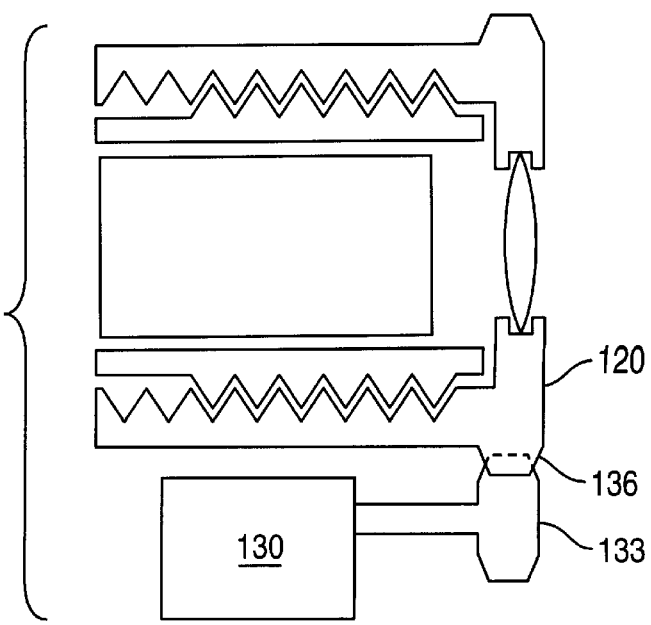

In another embodiment, the change of focus can be controlled by an electric motor 130 in FIG. 15C. The motor 130 drives a pinion gear 133, which drives a ring gear 136, which is connected to the support 120. This motor can be useful in video conferences, wherein one party wishes to show another party a close-up view of some subject, such as a document. In general, the video camera 110 will require re-focusing, to attain the close-up view.

In one approach to re-focusing, the party in possession of the subject matter will adjust the focus, as by the rotation indicated by the arrow 122 in FIG. 15A. While performing this focusing, the party watches the display 9 of FIG. 12, and stops the rotation when the focus becomes proper.

In another approach, since the remote party sees the image seen by camera 110, the remote party can control the focusing, by delivering appropriate signals to the motor 130.

In addition, one of the switches of the keypad 12 in FIG. 1B can be used to control the motor 130, so that a person actually holding the housing 15 can electrically control the focus, by pressing the key. This approach provides the advantage that the force applied to the components involved in moving the lens 113 (eg, the gears 133 and 136, the support 120, etc.) is of a controlled nature. Consequently, the components can be designed to withstand a controlled force. In contrast, if the components are required to withstand an uncontrolled force, such as that of a human hand, the handforces may be much larger, requiring the components to be more robust, and thus more expensive.

2. ADDITIONAL LENSES. A macro lens, wide-angle lens, or other type of lens may be desired. Such a lens is illustrated as lens 140 in FIG. 16. This lens 140 may be supported by a lever arm 145, which pivots about a pivot 150, from the position shown in FIG. 16A, to that shown in FIG. 16B, wherein the lens 140 is deployed over the camera.

Figure 16C:
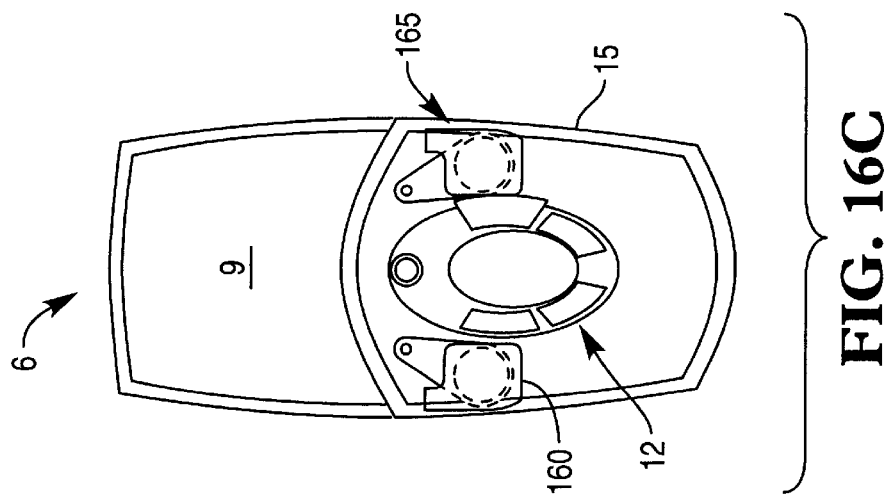
FIGS. 16A–16C illustrate an optional lens 140, which can be pivoted over pivot 18.
Figure 16B:
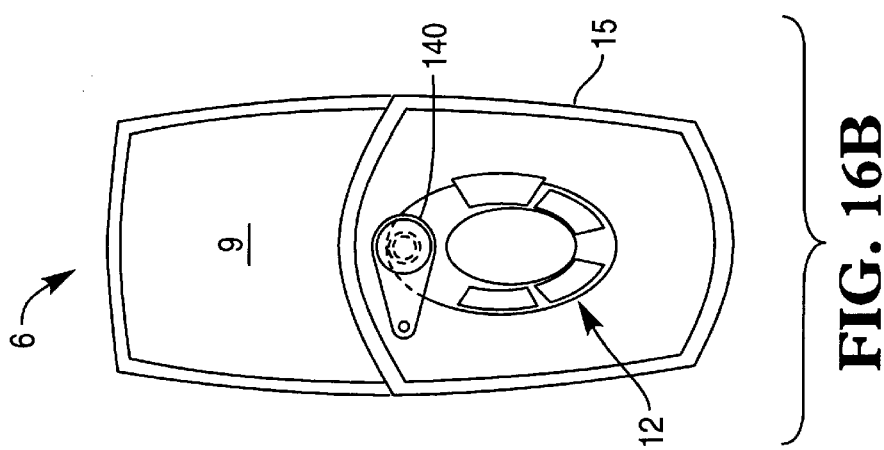
Figure 16A:
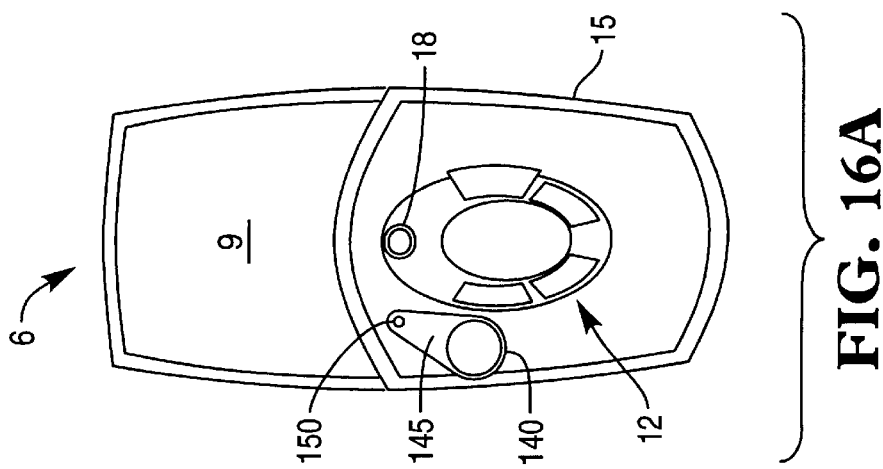

A protective pocket 160 in FIG. 16C may be provided, which protects the lens 140 when in a non-deployed state. In addition, a second lens, or a protective lens cover, indicated generally as unit 165 in FIG. 16C, may be provided, which functions similarly to the system which supports lens 140, just described.

3. FEATURES OF CAMERA. The video camera 110 in FIG. 12 has an image axis 190. The image axis is centered upon the object which the video camera views. The display 9 in FIG. 13 has an axis of rotation 195. The axis of rotation 195 can coincide with the image axis 190. These two axes can be parallel. Or the axis of rotation can penetrate the video camera 110, as by lying adjacent the image axis 190 in FIG. 12 (adjacency is not shown).

Provided that the no lens cap covers the video camera 110, the video camera can always receive images, no matter what position the display 9 in FIG. 13 resides. That is, in principle, when the apparatus occupies the configuration 120 in FIG. 13 (third from left), which is a "closed" or "stowed" configuration, the video camera behind lens 113 is still able to receive images. However, whether the video camera 110 responds to these images, by producing video signals, will depend upon whether it is enabled by the electronic circuitry which controls it.

4. POSITION OF CAMERA. A significant feature of the invention is that the video camera 110 in FIG. 12 is adjacent the display 9. With this arrangement, during a video conference, the person holding the housing 15 (the "holder") will look at the display 9, in order to see the other party to the conference (the "remote party"), whose face will appear on the display. But, because of the positioning of the camera 110, namely, at pivot 18, it will appear to the remote party that the holder is looking directly at the remote party. A numerical example will illustrate.

Figure 17:
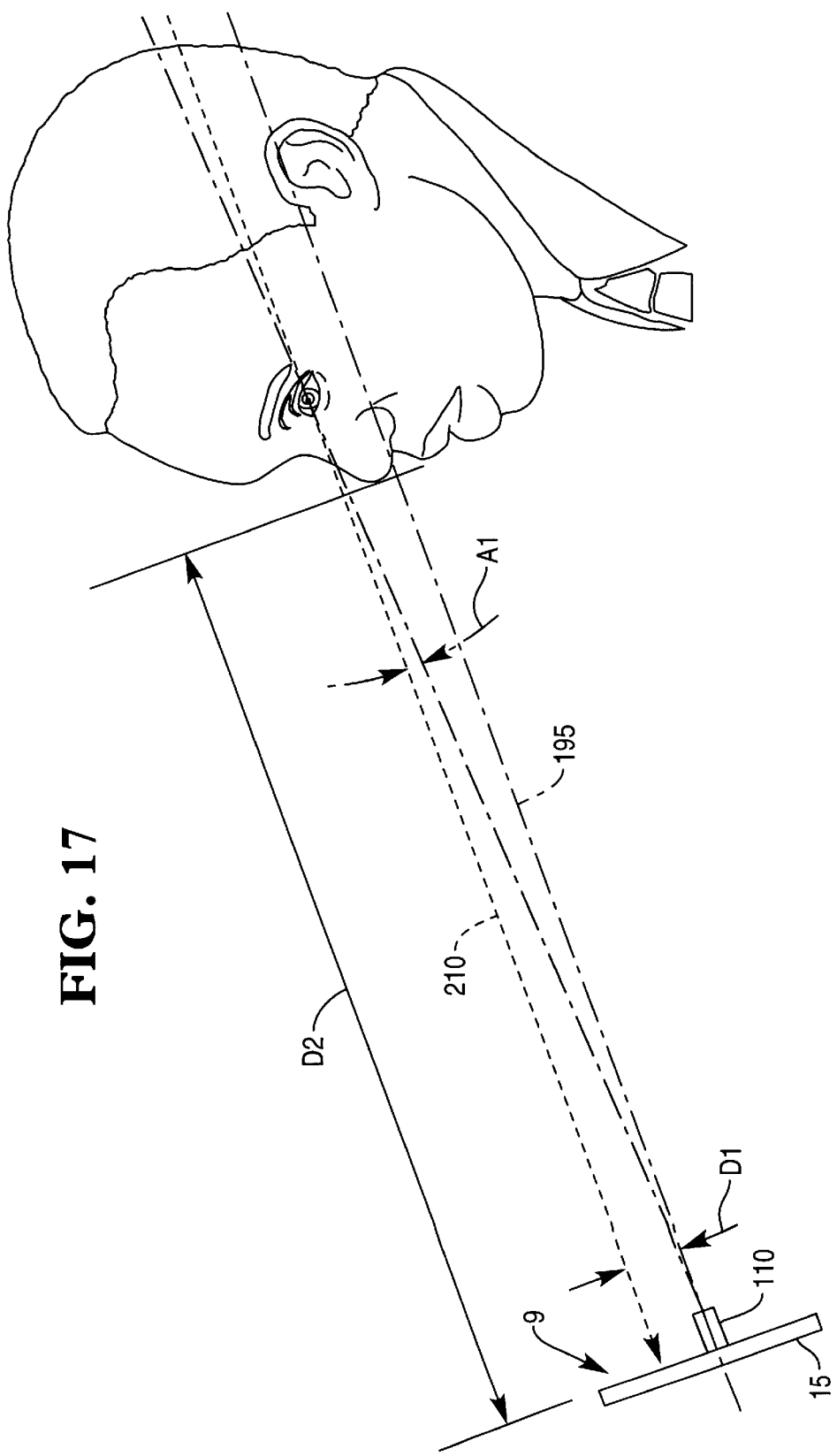
FIG. 17 illustrates angle A1, which the optical axis of camera 110 makes with a person's line-of-sight 210.

In FIG. 17, assume that a user is 30 inches (dimension D2) from the housing 15. Assume that the image axis 195 of camera 110 is separated from the center of the display 9 by a distance of two inches (dimension D1). Thus, even though the user looks at the display 9, as indicated by arrow 210, and not directly at the camera 110, the angle A1 which separates the center of the camera 110 from the center of the display is 3.8 degrees of arc. (2/30=0.0667; Inverse tangent of 0.0667 is 3.8 degrees.)

This is a small arc. Consequently, the image seen by the camera 110 indicates that the user is looking directly at the camera.

Second Additional Embodiment

The large button 230 in FIG. 1B can be used as a pointing device. Several approaches can be taken to implement the pointing device.

Figure 18:
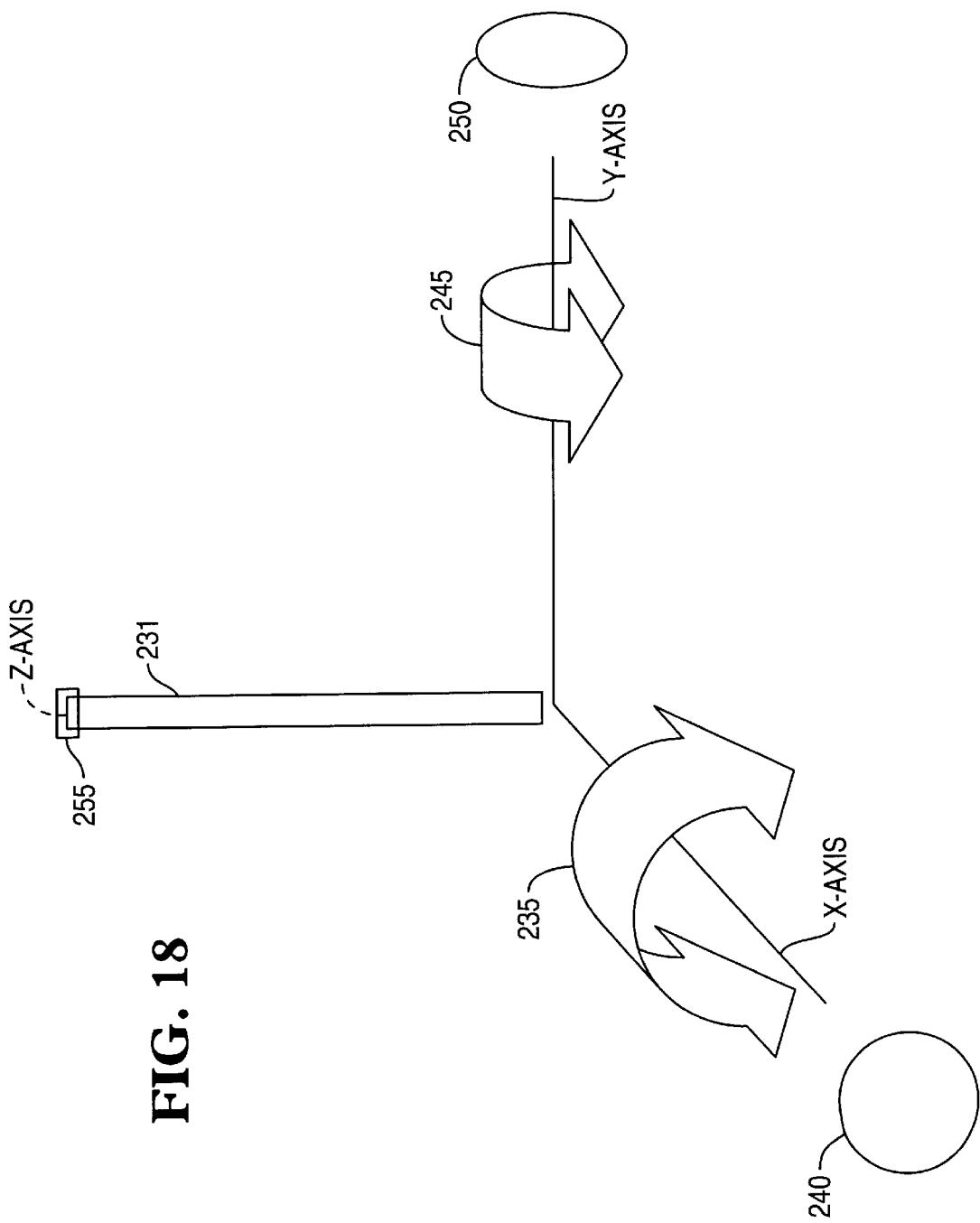
FIG. 18 illustrates a joystick, having a momentary-contact switch 255.

FIG. 18 is a simplified schematic of a common joystick. The actual "stick" is represented by rectangle 231. When a user (not shown) rotates the stick 231 about a y-axis, as indicated by arrow 245, a potentiometer, or optical encoder, 250 detects the rotation, and issues a signal indicating the amount of rotation. This signal is fed to a computer program, called a "driver" in the art, which moves a cursor 243 in FIG. 19A, generated on the display 9, in the y-direction 244. The cursor 243 moves a distance corresponding to the amount of rotation of the stick 231 of FIG. 18.

Similarly, when the stick 231 in FIG. 18 is rotated about an x-axis, as indicated by arrow 235, a second potentiometer, or optical encoder, 240 detects the rotation, and issues a signal indicating the amount of rotation. The driver moves the cursor 243 in FIG. 19A in the x-direction 252. The cursor 243 moves a distance corresponding to the amount of rotation of the stick 231 of FIG. 18.

Figure 19A:
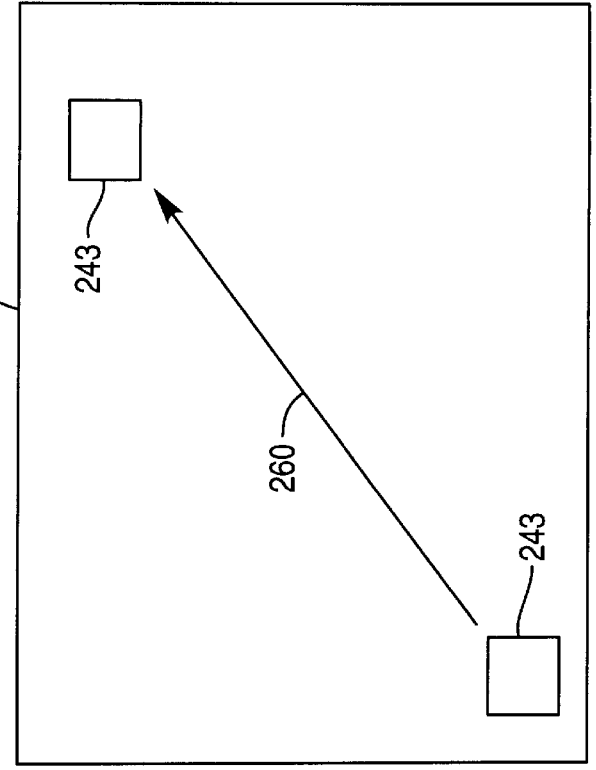
FIGS. 19A and 19B illustrate movement of a cursor 243 on a computer display 9.
Figure 19B:
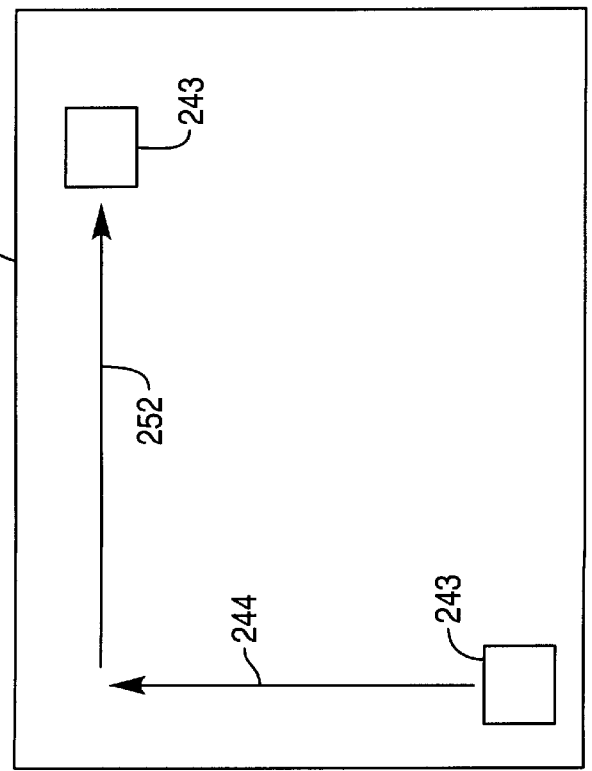

If both types of rotation of the stick 231 occur at once, the two types of motion of the cursor, shown in FIG. 19A, also occur at once, causing the cursor 243 to move along the diagonal path 260 in FIG. 19B.

Therefore, a simplified explanation has been given of how a joystick can move the cursor 243 in FIG. 19A. Joysticks also generally contain a momentary contact switch 255, shown in FIG. 18, which is actuated by a finger-pressed button (not shown in detail).

This type of button can be used for key 230 in FIG. 1B. A miniaturized version of the joystick can be associated with this key 230, so that left-right motion of the key 230 causes the rotation indicated by arrow 235 in FIG. 18, and forward-aft motion of the key 230 causes the rotation indicated by arrow 245 in FIG. 18. Pressing the key 230 in FIG. 1B into the housing 15 closes the momentary contact switch 255 in FIG. 18, causing an action which will be explained shortly.

Figure 20B:
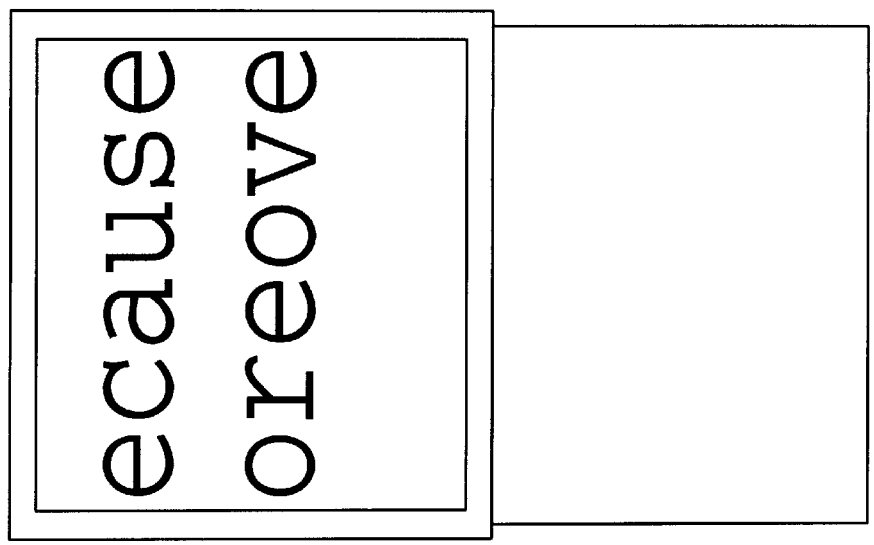
FIG. 20B illustrates enlargement of a region of the text, which is contained in a cursor 243.
Figure 20A:
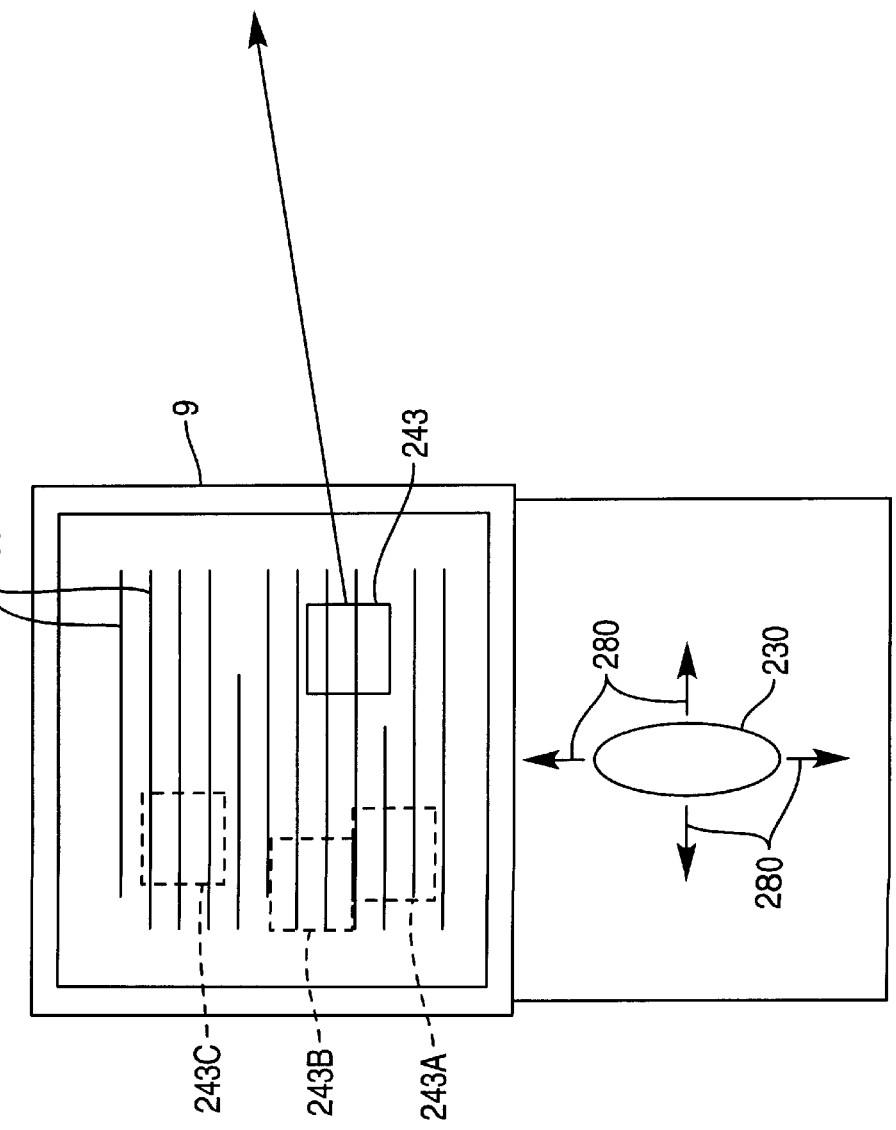
FIG. 20A illustrates lines of text 265.

FIG. 20A illustrates how this miniature joystick apparatus can be used with the invention. Display 9 contains an image, such as lines 265 of text. Cursor 243 is present on the display 9. Moving the key 230, in any combination of directions 280, causes rotation of the stick 231 of FIG. 18, which is not shown in FIG. 20A, thereby causing movement of the cursor 243. The user can, by proper motion of the key 230, move the cursor successively through positions 243A, 243B, and 243C, for example.

When the user presses the key 230, the invention enlarges the image surrounded by the cursor, producing, for example, the image shown in FIG. 20B. Pressing key 230 twice, in rapid succession, causes the display 9 to revert to that shown in FIG. 20A.

Figures 21, 22:
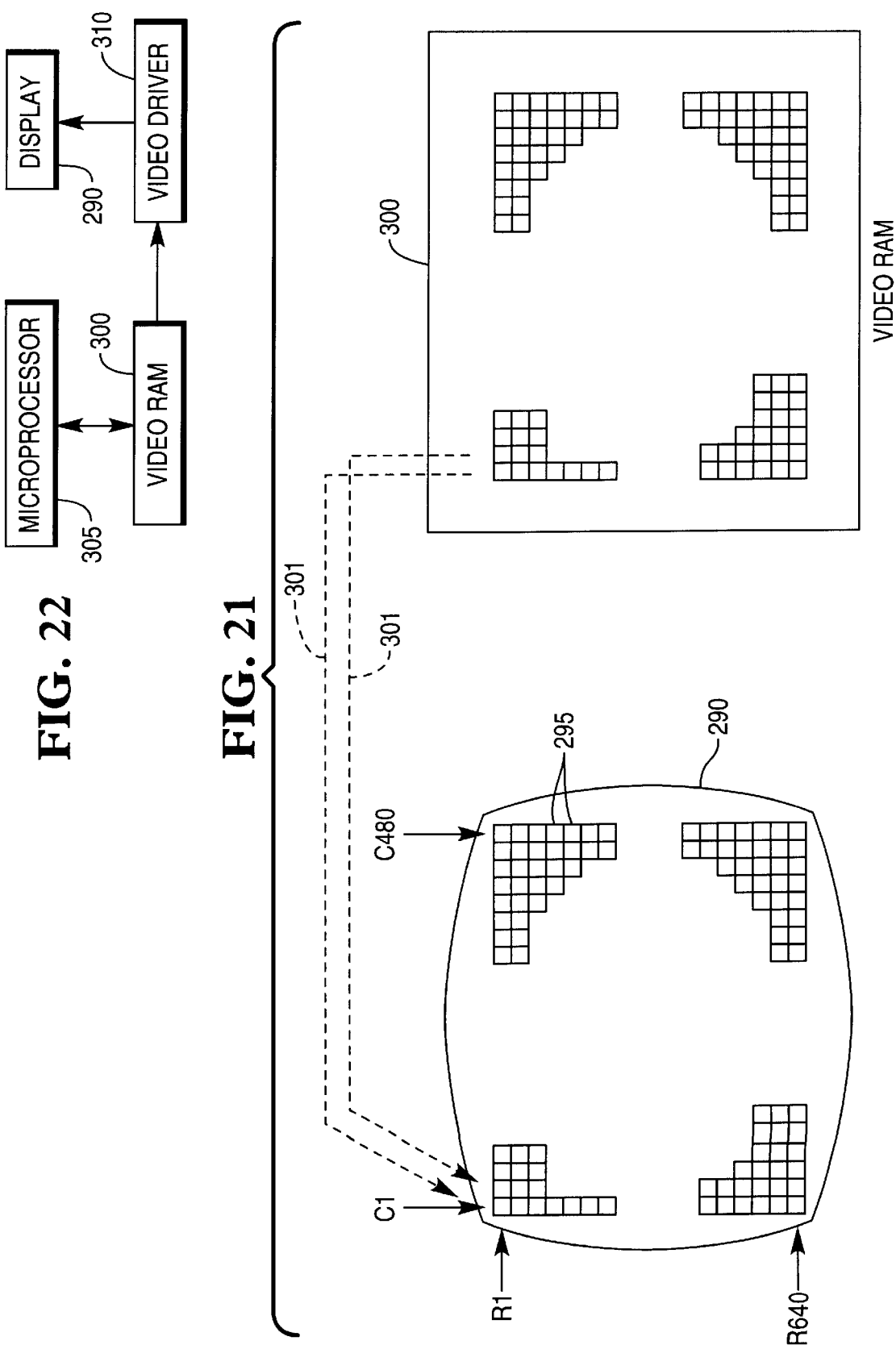
FIG. 21 illustrates correspondence between memory locations in video RAM and pixels 295 on a display.
FIG. 22 illustrates a simplified architecture of a computer for generating video displays.

A phenomenon occurring during the enlargement operation will now be considered. First, a brief background regarding the generation of images on computer displays will be given. FIG. 21 illustrates a standard computer display 290, containing pixels 295. In this display, the pixels 295 are arranged in 480 columns, C1 through C480, and in 640 rows, R1 through R640.

The color and brightness of each pixel is controlled by data stored in a memory location assigned to the pixel in video RAM 300. Thus, as indicated by arrows 301, every memory location in video RAM 300 corresponds to a particular pixel.

FIG. 22 is a simplified representation of one type of architecture which generates the image on the display 290. A microprocessor 305 writes data to the video RAM 300. A video driver 310, which takes the form of specialized electronic circuitry, reads every memory location in the video RAM at a very high speed and, based on the data read, generates the signals necessary for the display 290 to generate the appropriate pixels.

FIG. 23 illustrates the relevance of this background discussion to the invention. FIG. 23A illustrates an 8×8 pixel image of the number "5", such as may be contained within cursor 243 of FIG. 20. That image in FIG. 23A can be enlarged to the 16×16 pixel image shown in FIG. 23B, without error. The lack of error results from the fact that the enlarged image is exactly twice the length, and twice the width, in pixel units, of the original pixel image.

Figure 23A:
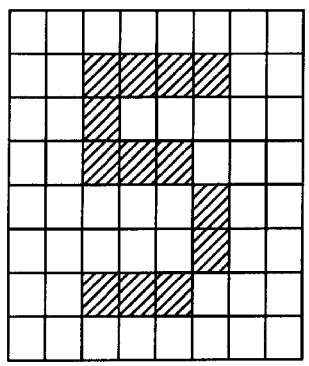
FIGS. 23A through 23D illustrate problems encountered in enlarging a pixel image.
Figure 23B:
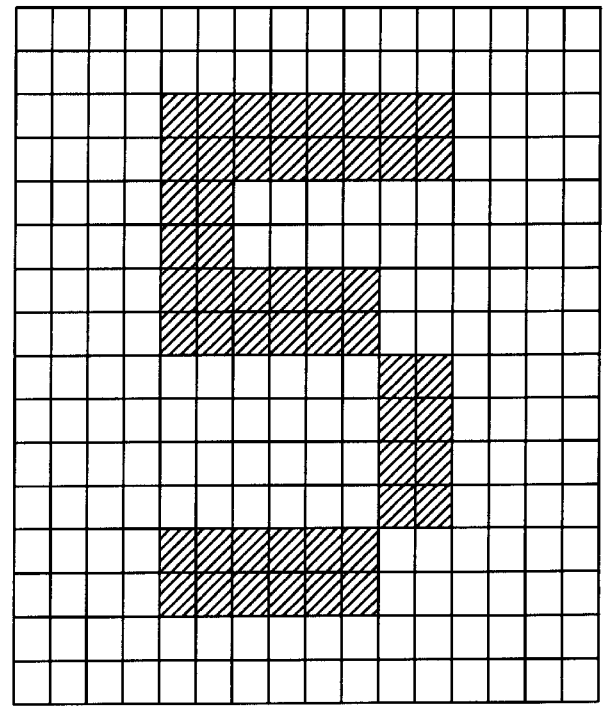
Figure 23C:
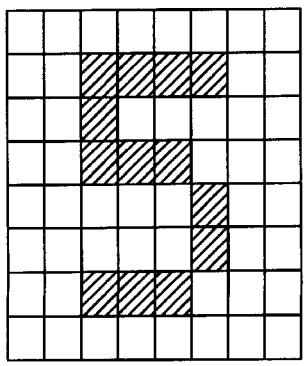
Figure 23D:
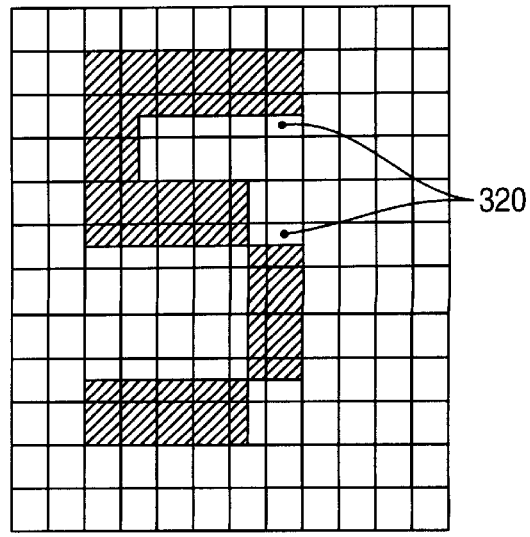

However, if the same 8×8 pixel image, now shown in FIG. 23C, is enlarged to that shown in FIG. 23D, which is a 12×12 pixel image, errors will arise, as indicated by pixels 320. The errors occur because a given pixel must be the same brightness and color throughout. Pixels cannot be partly colored, as are pixels 320.

The error occurs because the length, and width, of the pixel image of FIG. 23D are both 12 pixel units, while the corresponding dimensions of the original image of FIG. 23C were both 8 units. To enlarge the image of FIG. 23C to that of FIG. 23D, the length and width of each pixel must be increased by 50 percent. That is, each individual pixel in FIG. 23C will be represented by 1.5 pixels in FIG. 23D. But that is not possible, if only whole pixels are to be used in FIG. 23D.

Of course, it is possible to "round off" the enlarged image, as by making pixels 320 fully a single color, but the rounding creates an image which is not a perfect enlargement of the original.

Therefore, under the invention, to avoid this type of error, it is preferred that the length and width of the overall display 9 in FIG. 1B, in pixel units, be an integral multiple of both the length and width of the cursor 243 in FIG. 20A, again measured in pixel units. Further, it is preferred that the integral multiple be the same for both the length and the width. Some examples will illustrate these preferences.

The image of FIG. 23A is 8×8 pixels. If this represents the cursor image 243, then suitable sizes for the overall display are (N×8) rows×(M×8) columns. Specific examples of display size are 16×16 (wherein N=2 and M=2);
24×24 (wherein N=3 and M=3);
32×32 (wherein N=4 and M=4);
16×24 (wherein N=2 and M=3);
16×32 (wherein N=2 and M=4); and so on.

Of these preferred examples, the most-preferred display sizes occur when N equals M, and are 16×16, 24×24, 32×32, and so on.

In addition, when a second enlargement occurs, as when the image of FIG. 20B is enlarged, the same rule applies. Therefore, it is preferred that, whenever an enlargement of an image occurs, the width of the enlarged image, in pixel units, be an integral multiple of the width of the previous image. It is also preferred that the length of the enlarged image, in pixel units, be an integral multiple of the length of the previous image. It is also preferred that these integral multiples be the same. This preference also applies to reductions of an image.

When these preferences are fulfilled, no rounding of the type discussed above is required.

Figure 24:
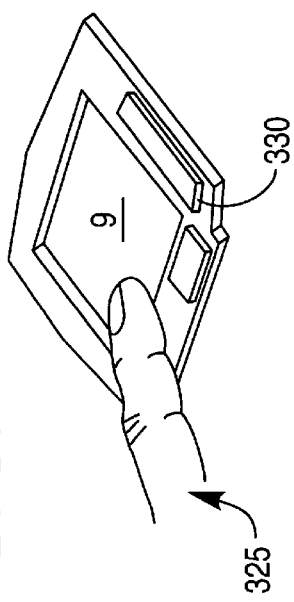
FIG. 24 illustrates a touch-screen display.

FIGS. 24–27 illustrate alternate approaches to the joystick of FIG. 18. In FIG. 24, a user moves a finger 325 over the display 9. The display is touch-sensitive. Touch-sensitive displays are known in the art. The cursor 243 in FIG. 18 is moved according to the position of the finger 325. Pressing a key 330 causes the enlargement described above.

Figure 25:
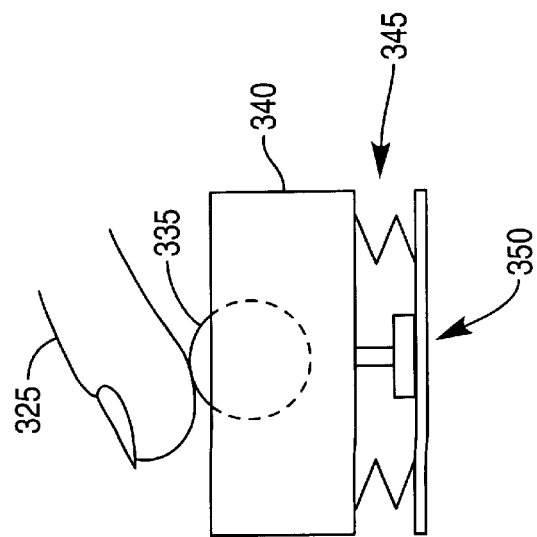
FIG. 25 illustrates a trackball 355, which acts as key 230 of FIG. 1B.

FIG. 25 illustrates a trackball 335, supported by a carriage 340. The trackball replaces key 230 in FIG. 1B (and may have an actual key attached to it, if desired). Springs 345 support the carriage 340. Downward pressure, applied by finger 325, closes a momentary-contact switch 350, which corresponds in function to switch 255 of FIG. 18.

Figure 26B:
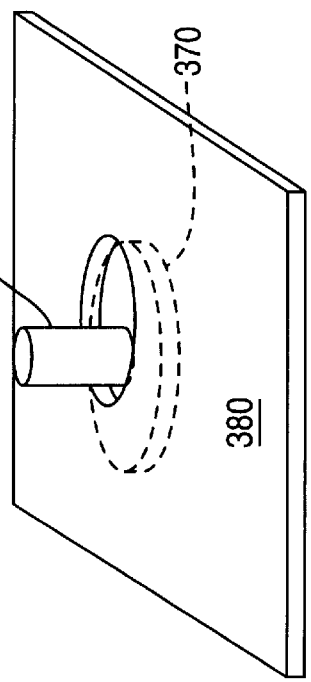
FIGS. 26A through 26C illustrate one implementation of key 230 in FIG. 1B.
Figure 26C:
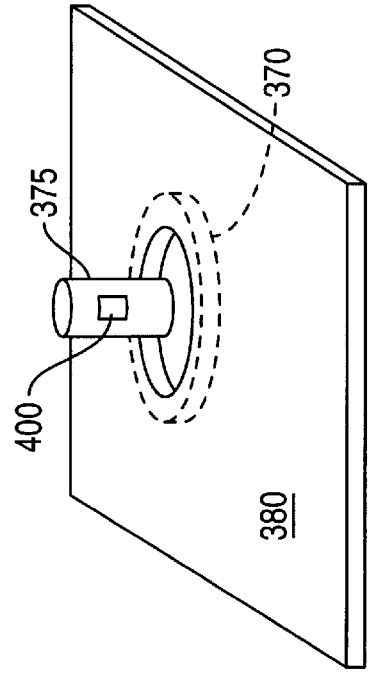
Figure 26A:
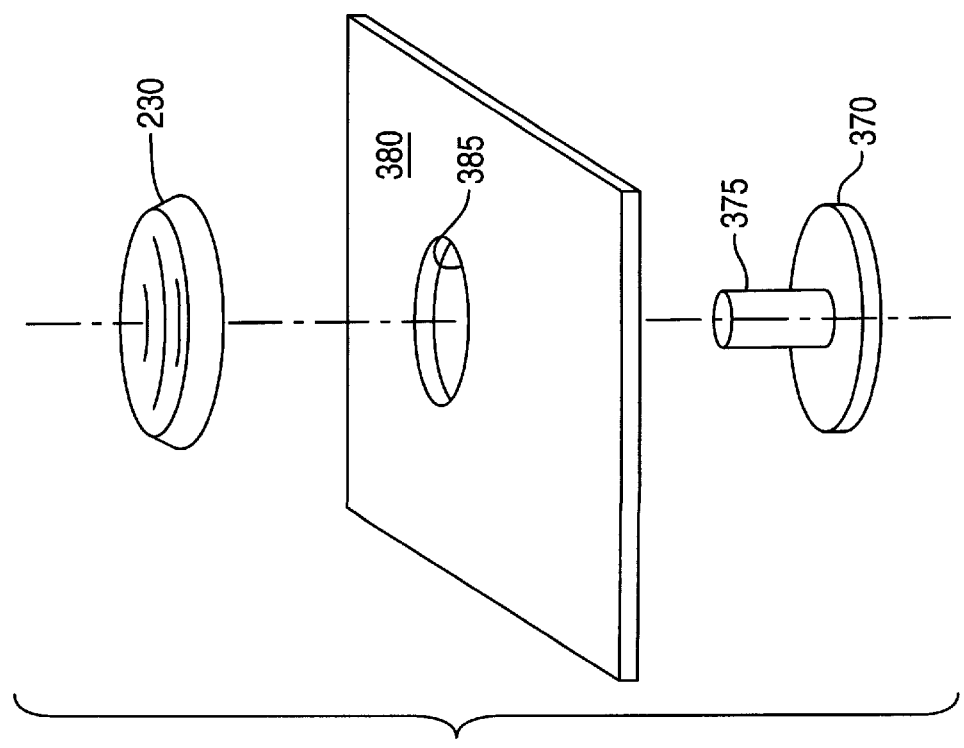

FIG. 26 illustrates what may be called a sliding joystick. In FIG. 26A, a disc 370 bearing a mast 375 fastens to key 230 (also shown in FIG. 1B), thereby trapping the surface 380 of the housing 15 shown in FIG. 1B between the disc 370 and the key 230 of FIG. 26A. The mast 375 is free to move within an aperture 385, of larger diameter, as indicated in FIGS. 26B and 26C.

Figure 27C:
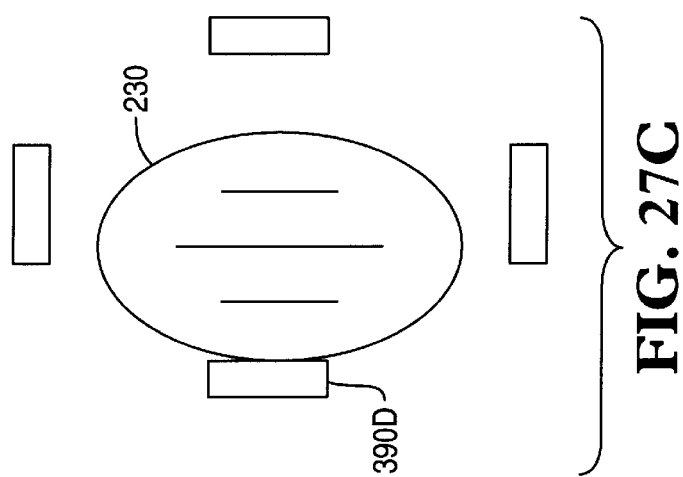
FIGS. 27A–27C illustrate proximity sensors 390, used for detecting position of key 230.
Figure 27B:
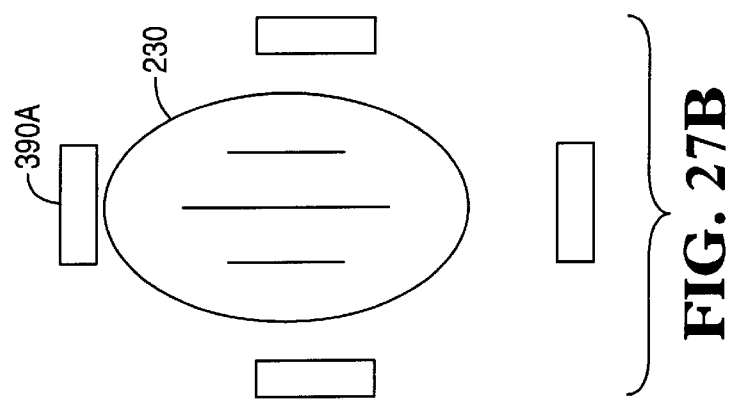
Figure 27A:
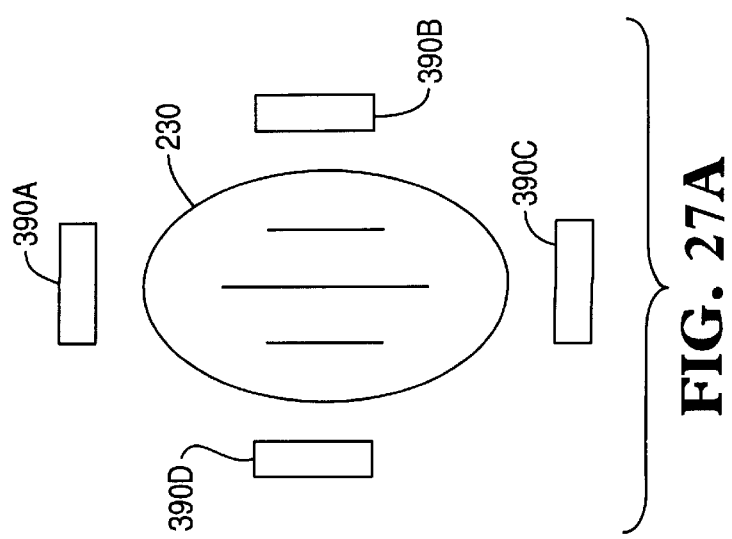

The position of the key 230 is detected by sensors 390 in FIG. 27. For example, in FIG. 27B, sensor 390A produces the largest signal, because the key 230 is closest to it. In FIG. 27C, sensor 390D produces the largest signal, because the key 230 is closest to it.

The proximity sensors 390 can take the form of optical proximity sensors, such as those sold by OMRON Corporation, and available from Digi-Key Corporation, Thief River Falls, Minn. The proximity sensors produce an analog voltage which is correlated with the distance between the sensor and the disc 370 (Disc 370 is not shown in FIG. 27.

Alternately, two sliding potentiometers can be actuated by the key 230,

The mast 375 of FIG. 26C can contain a momentary contact switch 400, analogous in function to that of switch 255 in FIG. 18.

Figure 28:
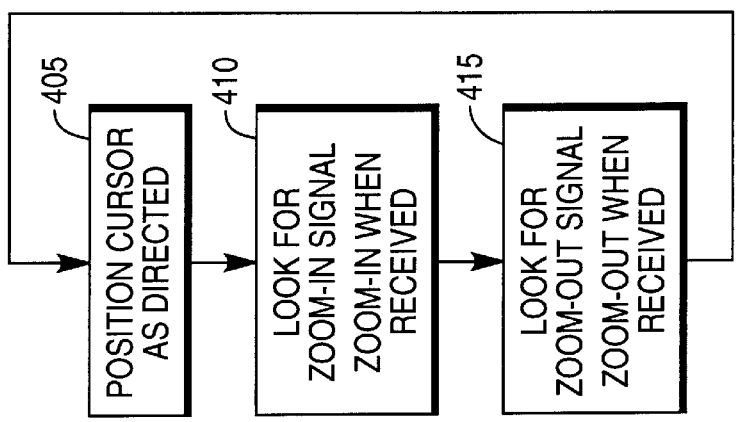
FIG. 28 illustrates logic implemented by one form of the invention.

FIG. 28 illustrates logic executed by one form of the invention. Block 405 indicates that the cursor 243 in FIG. 20A is positioned, according to the position of key 230 in FIG. 1B. If a miniature joystick, or trackball 335 of FIG. 25, is used in association with the key 230, then commercially available software drivers are used to position the cursor.

Block 410 in FIG. 28 looks for a "zoom-in" signal. This signal can take the form of a long-duration closure of the momentary contact switch, such as 1.0 or 2.0 seconds. In response, the zoom, or enlargement, operation discussed in connection with FIG. 20 is undertaken.

Block 415 in FIG. 28 looks for a "zoom-out" signal. This signal can take the form of a rapid double-closure of the momentary contact switch, such as two closures in 1.0 seconds. In response, the a zoom-out operation is undertaken, which can be represented as a change from the display of FIG. 20B to that of FIG. 20A.

A significant feature of key 230 in FIG. 1B is that a single key allows both navigation (ie, movement of the cursor) and selection (ie, actuation of the momentary contact switch 255 in FIG. 18). From another point of view, the key 230 issues three types of signal: two navigation signals, which move the cursor, and a control signal, used for purposes such as enlargement.

The control signal, in being generated by a momentary contact switch, can be viewed as a sequence of bits. That is each closure represents a digital ONE, while each opening of the switch represents a ZERO. Further, each bit can be of different durations, as in Morse code. Software, known in the art, can discriminate between different bit sequences, issued by the switch, in response to operator actuation.

Third Additional Embodiment

Figure 29B:
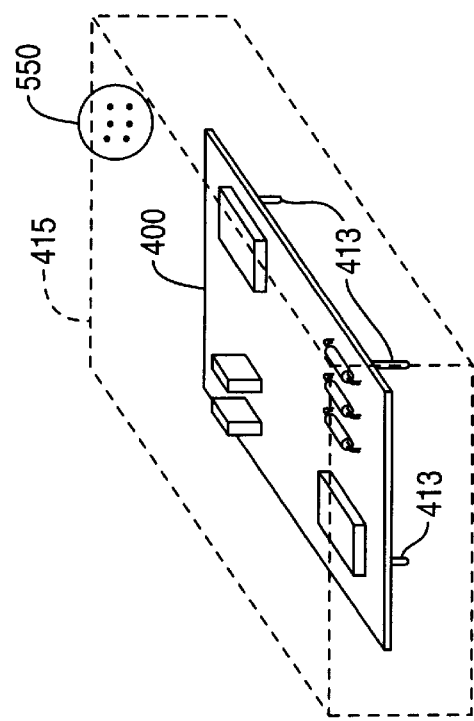
FIG. 29B illustrates a printed circuit board 400 encased within solidified plastic resin 415.
Figure 29A:
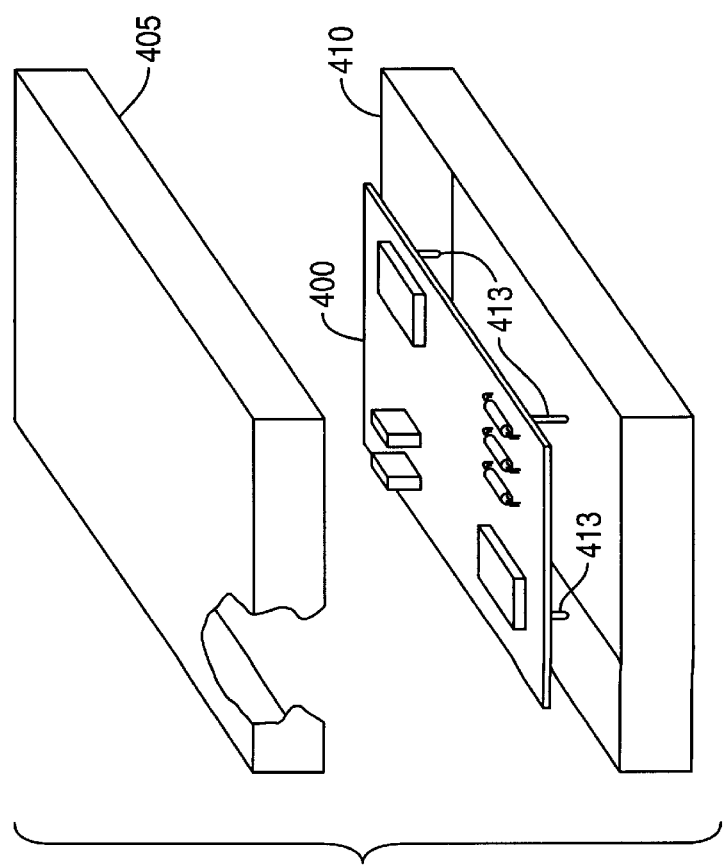
FIG. 29A illustrates a printed circuit board 400 contained within a mold.

FIG. 29A illustrates a printed circuit board 400, and two hollow, mating halves 405 and 410 of a mold. The two halves 405 and 410 are mated together (mating not shown), with the circuit board supported within, and a plastic resin is injected into the mold. In one embodiment, the circuit board 400 is supported by stand-offs 413, which are attached to the board, and which hold the board in position during the injection process.

After the resin cures, the two mold halves are removed, producing the solid body 415 in FIG. 29B. If stand-offs 413 were used, they are now cast within the solidified block 415.

The resin can take the form of a butyl rubber, or Ethylene Propylene Diamine rubber, EPDN. This type of resin is flexible, and allows an amount of bending to occur, which can be desirable when the circuit board 400 is part of a portable apparatus. This bending allows the apparatus to be carried in a pocket, without discomfort. In addition, the flexible resin provides protection against mechanical shock.

Encasing the circuit board 400 within the resin 415 provides many advantages, which can be appreciated by reference to another approach used. In that approach, hollow clamshell-type housings (not shown) are used. However, use of such housings for the circuit board 400 tends to be somewhat expensive, because details must be molded into both the inner side, and the outer side, of each half of the clamshell. The details on the inner side are concerned with support of the circuit board 400, and other internal components. Manufacturing molds which contain these details is expensive, as is the process of mounting circuit boards and other components to the clamshells.

FIG. 30 illustrates another form of the invention. A special two-part mold is used, which comprises halves 420 and 425. FIG. 31 shows the halves 420 and 425 in cross-section, and FIG. 32 shows the halves when assembled. As FIGS. 30 and 32 indicate, the halves, when assembled, form a chamber 430. All four sides 435 in FIG. 30 of the perimeter of the circuit board 400 penetrate this chamber, as indicated by side 435 in FIG. 32.

Figure 33:
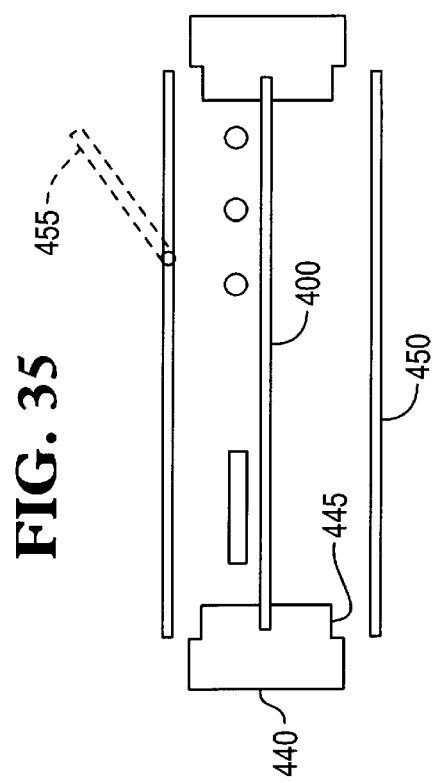
FIG. 33 illustrates an apparatus produced by the mold of FIG. 30.
Figure 34:
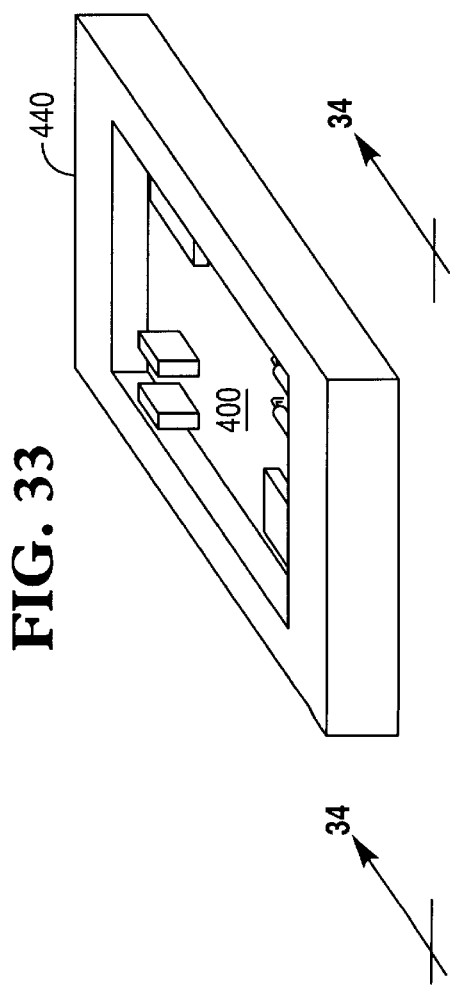
FIG. 34 is a cross-sectional view of the apparatus of FIG. 33.
Figure 35:
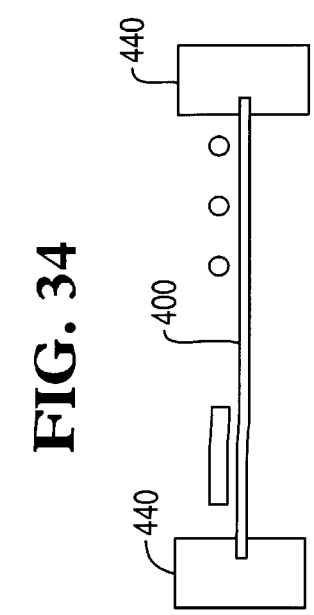
FIG. 35 is a cross-sectional view of a modification of the apparatus of FIG. 34.

The resin is injected into this chamber 435. After the resin has cured, and the mold-halves removed, the structure shown in FIG. 33 is produced. A frame 440 of resin, preferably flexible, surrounds the circuit board 400. FIG. 34 is a cross-sectional view, taken along lines 34—34 in FIG. 33. Recesses 445 can be molded, or otherwise provided, in the frame 440, for receiving a sheet material 450 which encloses the circuit board 400. The sheets 450 can be equipped with doors 455, for allowing access to the circuit board 400, for purposes such as replacing electrical batteries, setting DIP switches, and so on.

FIG. 36 indicates mechanical switches 460, which are attached to the circuit board 400, prior to injection of the resin. The mechanical switches 460 require movement of a switch button 465, as indicated by FIGS. 37A and 37B. The switches are used to provide an interface for an operator, and the switch buttons 465 can be viewed as analogous to keys of the keypad 12 in FIG. 1B.

Figure 38A:
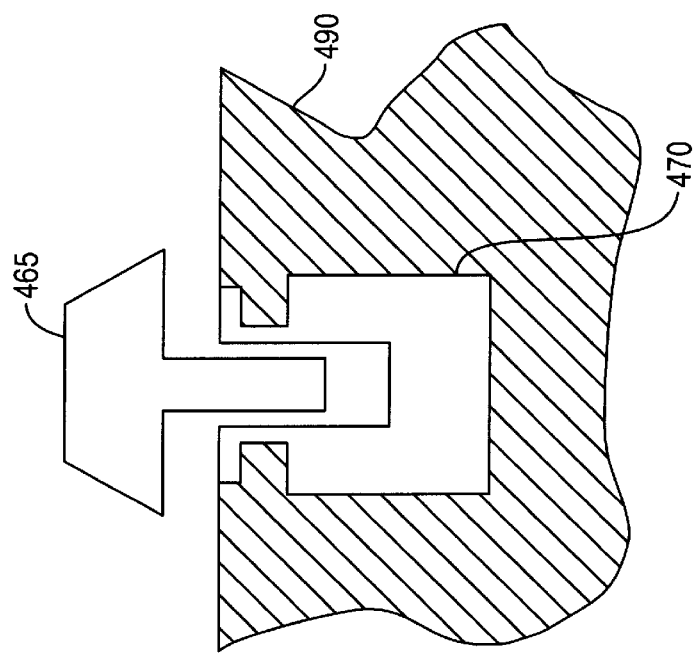
FIGS. 38A, 38B, and 38C illustrate a process for encasement of switch body 470 in plastic resin.
Figure 38B:
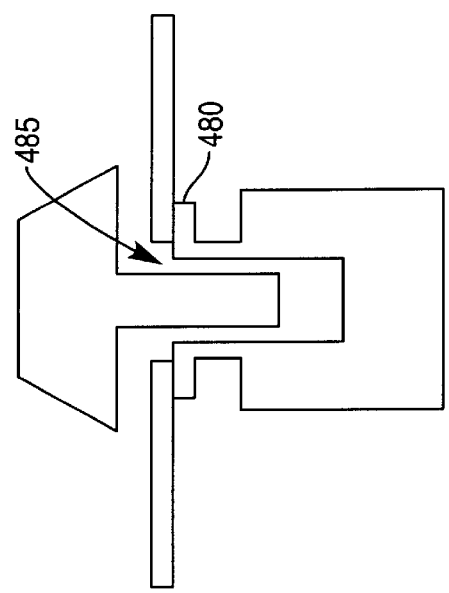

Because the switch buttons 465 in FIG. 37 must be allowed freedom to travel, they cannot be encased within the resin. Such encasement would lock them in position. To prevent this encasement, the body 470 of the switch 460 in FIG. 38A is equipped with a neck 475, which supports an annular flange 480. The mold is equipped with an aperture 485 in FIG. 38B, the perimeter of which mates with the annular flange 480. The switch buttons 465 can be designed to be removable for this step, if desired.

Figure 38C:
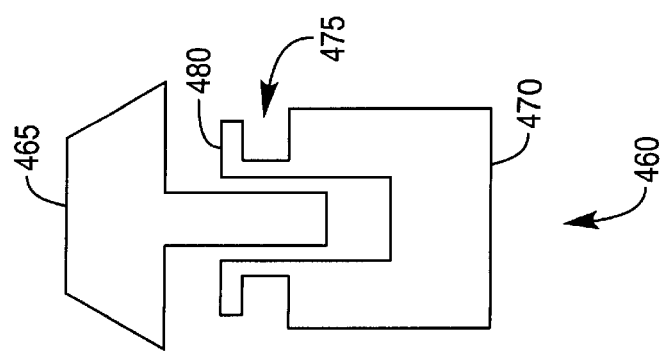

After the mold has been filled with resin, and then removed, the structure shown in FIG. 38C is produced. The switch body 470 has been encased in the resin 490, but the switch button 465 remains operable.

It may be desirable to use non-mechanical switches, which do not require movement. FIG. 39 illustrates one possibility, wherein conductive contacts 500 and 501 are encased within the surface of the resin block 415. When a finger F touches the contacts, circuitry contained in the circuit board (not shown) detects the touch, as by detecting a change in resistance, capacitance, or another parameter. Touch sensors are known in the art.

Another approach is shown in FIG. 40. An optical proximity sensor 505, as described above, emits a ray of light 510. Ordinarily, the ray 510 is not reflected, as indicated in FIG. 40B. But the presence of finger F, in FIG. 40C, causes reflection, as indicated. The sensor 505 detects the reflection, and produces a signal in response.

As FIG. 40A indicates, the optical proximity sensor 505 is encased within the resin block 415, and light ray 510 travels through the resin material. It may be preferable to place the sensor 505 at the very surface of the block 415, as indicated in FIG. 40D, so that the light ray 510 need not travel through the resin material.

Alternately, the resin material may be selected to minimize reflection of the light ray 510. That is, the light ray 510 is produced by a Light-Emitting Diode, LED. LEDs are, structurally, a PN junction of semiconductor material, which is encased in its own plastic resin, which is designed to maximize light transmission out of the resin, while serving to protect the PN junction from mechanical damage.

The resin of which block 415 in FIG. 40A is made can be selected to have the same, or close, dielectric constant as the resin of which the LED is made. This matching of dielectric constants serves to reduce, or eliminate, reflection of light at the interface between the LED, contained within block 415 in FIG. 40A, and the resin of block 415 itself. Restated, this matching creates an impedance match between the LED and the resin of block 415, thereby reducing, or eliminating, the reflection coefficient.

In another alternate approach, only the region of the block through which the light ray 510 travels is impedance-matched to the LED. FIG. 40B illustrates region 525, which is impedance-matched to the LED. The surrounding region 530 is constructed of a resin having a different dielectric constant, and thus a different impedance.

Additional Considerations

1. Ordinary printed circuit boards are not highly flexible. However, flexible printed circuits are available, and are used, for example, in automobile dashboards. These flexible printed circuits contain metallic traces which are deposited onto a flexible insulator, such as that sold under the trade name MYLAR.

Some of these printed circuits are sufficiently flexible to bend into a loop of diameter of about 3 to 6 inches, without damage, at room temperature. Such flexible printed circuits may be used by the invention, when a flexible resin is used.

2. In the solid-body embodiment of FIG. 29B, a requirement of dissipating heat from the circuit board 400 may exist. In such a case, a heat-conductive resin may be used. One approach to making a heat-conductive resin is to add heat-conductive particles to an ordinary resin, which are indicated by dots 550 in FIG. 29B.

Figure 41:
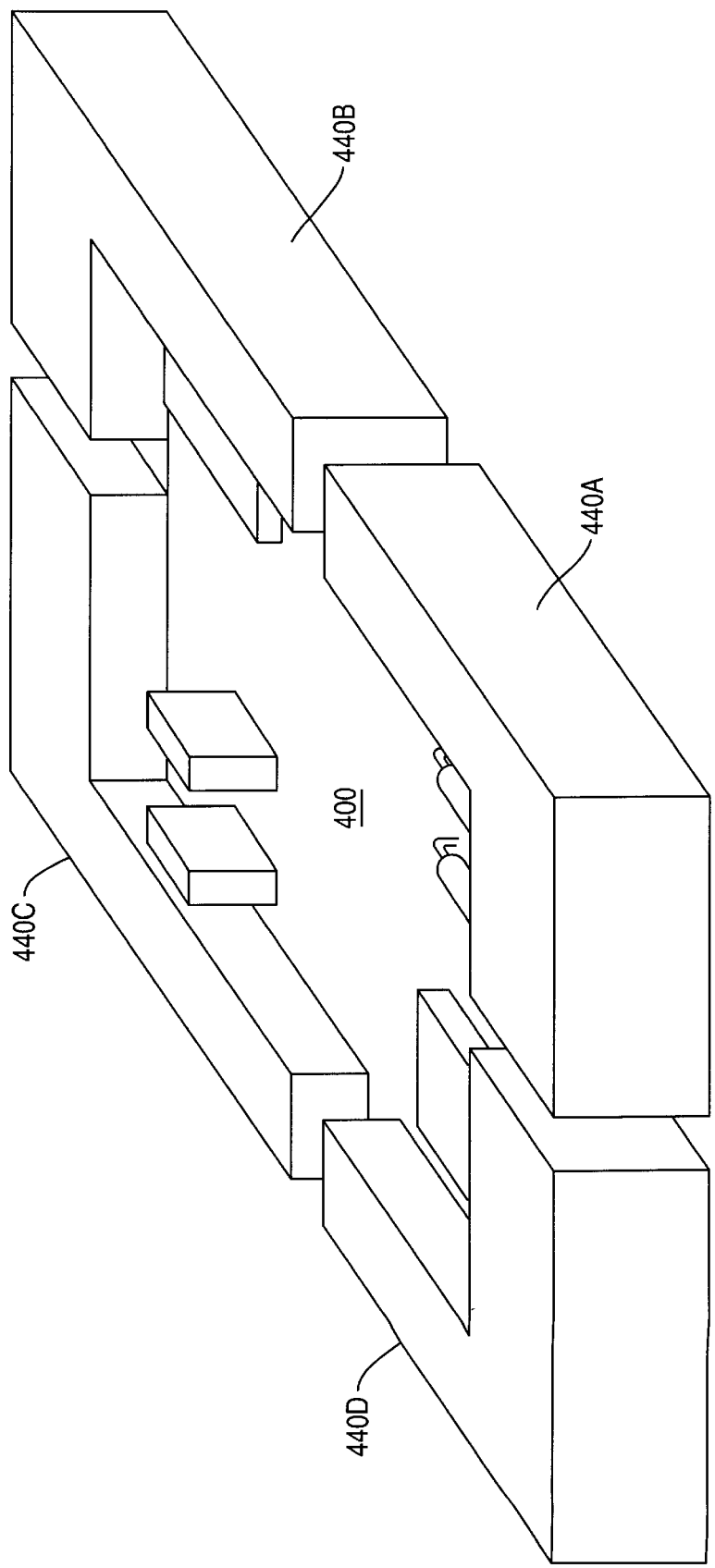

3. The frame 440 of FIG. 33 can be segmented, as shown in FIG. 41, which shows four segments 440A through 440D.

4. FIG. 42 illustrates another form of the invention. Body 45 is a solid mass of solidified, injection-molded plastic resin, which encases a printed circuit board PCB. Display 9 pivots, as described above.

A resin which is flexible, when cured, can be used. The flexible resin acts as a shock-absorbing material, to dissipate the energy of mechanical shocks. Such shock absorption can also be useful in protecting the display 9, when this display takes the form of a Liquid Crystal Display, LCD.

LCDs can be quite fragile, in that they comprise a liquid crystal material which is sandwiched between two sheets of glass, or transparent plastic. When encased within a frame of injection-molded, shock-absorbing resin, as indicated by frame 563, the LCD becomes protected against mechanical shock. This encasement can be accomplished by the molding process indicated in FIGS. 30–33.

5. Printed circuits, and circuit boards, of a thickness ranging from 0.010 to 0.050 inches can be used.

Numerous substitutions and modifications can be undertaken without departing from the true spirit and scope of the invention. What is desired to be secured by Letters Patent is the invention as defined in the following claims.

What is claimed is:

1. For an electronic device having a housing, the improvement comprising:

a) a display rotatable about an axis of rotation and about no other axis; and
b) a video camera,
   i) having an image axis which coincides with the axis of rotation,
   ii) which is non-rotatable with respect to the housing, wherein the center of the display is separated from the center of the video camera by no more than about 5 degrees of arc, with respect to a center 30 inches away, wherein an image captured by the video camera of a person viewing the display indicates that the person is looking at the camera.

2. Apparatus according to claim 1, wherein the video camera is about ½ inch in diameter.

3. For an electronic device having a housing, the improvement comprising:

a) a display rotatable about a single axis of rotation and no other;
b) a video camera, having an image axis substantially parallel with said axis of rotation, which camera does not rotate with respect to the housing, when the display rotates; and
c) a lens cap for said video camera, pivotable between
   i) a stowed position and
   ii) a deployed position, wherein the lens cap protects a lens of the video camera,
wherein the display always faces the direction in which the video camera points, and wherein the image produced by the camera does not rotate as the display is rotated with the housing stationary.

* * * * *